United States Patent
Hosseini et al.

(10) Patent No.: US 11,064,514 B2
(45) Date of Patent: Jul. 13, 2021

(54) UPLINK COLLISION HANDLING FOR WIRELESS COMMUNICATIONS

(71) Applicant: QUALCOMM Incorporated, San Diego, CA (US)

(72) Inventors: Seyedkianoush Hosseini, San Diego, CA (US); Yi Huang, San Diego, CA (US)

(73) Assignee: QUALCOMM INCORPORATED, San Diego, CA (US)

(*) Notice: Subject to any disclaimer, the term of this patent is extended or adjusted under 35 U.S.C. 154(b) by 122 days.

(21) Appl. No.: 16/534,612

(22) Filed: Aug. 7, 2019

(65) Prior Publication Data

US 2020/0053761 A1 Feb. 13, 2020

Related U.S. Application Data

(60) Provisional application No. 62/717,488, filed on Aug. 10, 2018.

(51) Int. Cl.
*H04W 72/12* (2009.01)
*H04W 72/10* (2009.01)
*H04W 72/04* (2009.01)

(52) U.S. Cl.
CPC ....... *H04W 72/1284* (2013.01); *H04W 72/10* (2013.01); *H04W 72/1242* (2013.01); *H04W 72/0413* (2013.01)

(58) Field of Classification Search
CPC ......... H04W 72/1284; H04W 72/1242; H04W 72/10; H04W 72/0413; H04W 72/1268; H04W 28/24; H04L 5/0064; H04L 5/0053; H04L 5/0007
See application file for complete search history.

(56) References Cited

U.S. PATENT DOCUMENTS

| | | | |
|---|---|---|---|
| 10,568,129 B2* | 2/2020 | Jeon | H04W 72/044 |
| 2019/0045556 A1* | 2/2019 | Bagheri | H04W 74/0858 |
| 2019/0261391 A1* | 8/2019 | Kundu | H04W 72/0446 |
| 2019/0327757 A1* | 10/2019 | Oteri | H04L 5/0053 |
| 2020/0022161 A1* | 1/2020 | Yang | H04L 27/2602 |
| 2020/0036473 A1* | 1/2020 | Nemeth | H04L 1/203 |
| 2020/0153541 A1* | 5/2020 | Faxer | H04L 5/0057 |
| 2020/0344032 A1* | 10/2020 | Yang | H04W 72/04 |
| 2020/0374085 A1* | 11/2020 | Yin | H04L 1/0031 |
| 2020/0396758 A1* | 12/2020 | Falahati | H04W 72/1284 |

(Continued)

OTHER PUBLICATIONS

International Search Report and Written Opinion—PCT/US2019/045743—ISA/EPO—dated Oct. 29, 2019.

(Continued)

*Primary Examiner* — Brian T O Connor
(74) *Attorney, Agent, or Firm* — Holland & Hart LLP

(57) ABSTRACT

Transmissions or channels may collide with one another. In the event of a collision, a first channel may be prioritized over a second channel and the second channel may be dropped. The described techniques and methods relate to prioritizing transmissions, based in part on service types, to mitigate increased latency and poor reliability. Accordingly, the described techniques may provide methods for prioritizing transmissions in the event of overlapping transmissions to decrease latency and improve reliability of transmissions for different service types.

29 Claims, 14 Drawing Sheets

(56) References Cited

U.S. PATENT DOCUMENTS

2020/0404692 A1* 12/2020 Yin .................. H04L 1/0031
2021/0022129 A1* 1/2021 Yuan ................. H04L 1/1812

OTHER PUBLICATIONS

OPPO: "Discussion on Overlapped UL Transmissions with URLLC", 3GPP Draft; R1-1806837, 3rd Generation Partnership Project (3GPP), Mobile Competence Centre, 650, Route Des Lucioles, F-06921 Sophia-Antipolis Cedex, France, vol. RAN WG1, No. Busan, Korea; May 21, 2018-May 25, 2018 May 20, 2018, XP051442037, Retrieved from the Internet: URL:http://www.3gpp.org/ftp/Meetings%/5F3GPP%5FSYNC/RAN1/Docs/ [retrieved on May 20, 2018], 4 pages.

Qualcomm Incorporated: "Handling UCI on Pusch for URLLC," 3GPP Draft; R1-1807360 Handling UCI on PUSCH for URLLC, 3rd Generation Partnership Project (3GPP), Mobile Competence Centre; 650, Route Des Lucioles; F-06921 Sophia-Antipolis Cedex; France, vol. RAN WG1, No. Busan, Korea; May 21, 2018-May 25, 2018, May 20, 2018, XP051442552, 2 pages, Retrieved from the Internet: URL: http://www.3gpp.org/ftp/Meetings%5F3GPP%5FSYNC/RAN1/Docs/ [retrieved on May 20, 2018] p. 1, lines 39-42 p. 2, lines 1-36.

Qualcomm Incorporated: "Summary of Remaining Issues for UCI Multiplexing on PUSCH", 3GPP Draft; R1-1805666 Summary of Remaining Issues for UCI Multiplexing on PUSCH—Version 5, 3rd Generation Partnership Project (3GPP), Mobile Competence Centre, 650, Route Des Lucioles, F-06921 Sophia-Antipolis Cedex, France, vol. RAN WG1, No. Sanya, China; Apr. 16, 2018-Apr. 18, 2018 Apr. 19, 2018, XP051427793, Retrieved from the Internet: URL:http://www.3gpp.org/ftp/Meetings%5F3GPP%5FSYNC/RAN1/Docs [retrieved on Apr. 19, 2018], 10 pages.

VIVO: "Discussion on Handing UL Multiplexing of Transmissions with Different Reliability Requirements", 3GPP Draft; R1-1801550_Discussion on Handling UL Multiplexing of Transmissions With Different Reliability Requirements, 3rd Generation Partnership Project (3GPP), Mobile Competence Centre; 650, Route, vol. RAN WG1, No. Athens, Greece; Feb. 26, 2018-Mar. 2, 2018, Feb. 15, 2018, XP051396802, 5 Pages, Retrieved from the Internet: URL: http://www.3gpp.org/ftp/tsg%5Fran/WG1%5FRL1/TSGR1%5F92/Docs/ [retrieved on Feb. 15, 2018] figure 1 p. 1, lines 40-42 p. 2, line 1 p. 4, lines 3-10.

VIVO: "Remaining Issues on UL Data Transmission for URLLC", 3GPP Draft; R1-1806070 Remaining Issues on UL Data Transmission for URLLC, 3rd Generation Partnership Project (3GPP), Mobile Competence Centre; 650, Route Des Lucioles; F-06921 Sophia-Antipolis Cedex, vol. RAN WG1, No. Busan, Korea; May 21, 2018-May 25, 2018, May 20, 2018, XP051441284, 5 pages, Retrieved from the Internet<URL:< url: http://www.3gpp.org/ftp/Meetings%5F3GPP%5FSYNC/RAN1/Docs/ [retrieved on May 20, 2018] sections 2.2 and 2.3</url:>.

* cited by examiner

UPLINK COLLISION HANDLING FOR WIRELESS COMMUNICATIONS

CROSS REFERENCE

The present Application for Patent claims the benefit of U.S. Provisional Patent Application No. 62/717,488 by HOSSEINI, et al., entitled "UPLINK COLLISION HANDLING FOR WIRELESS COMMUNICATIONS," filed Aug. 10, 2018, assigned to the assignee hereof, and expressly incorporated herein.

BACKGROUND

The following relates generally to wireless communications, and more specifically to uplink collision handling for a wireless communication system and service types such as ultra-reliable low-latency communications (URLLC) and enhanced mobile broadband (eMBB) communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some cases, transmissions on channels may collide with one another. Although scheduling may mitigate some of the collisions, scheduling may introduce latency and decrease reliability of the transmissions, which may be problematic for higher-priority transmissions, such as URLLC. Accordingly, the existing techniques may be deficient for prioritizing channel transmissions that require low-latency or high reliability for multiple services.

SUMMARY

Generally the described techniques relate to improved methods, systems, devices, or apparatus that support uplink collision handling for wireless communications. The described techniques may provide methods for prioritizing transmissions in the event of overlapping transmissions and to decrease latency and improve reliability of transmissions for different types of communication services.

In some cases, wireless communication systems may schedule communication resources to support both uplink and downlink transmissions. For example, a wireless communication system may allocate a set of resources to uplink transmissions. In one example, a base station may schedule overlapping transmissions on multiple channels. Once the user equipment (UE) transmits or uplinks to the base station, a collision may result as a result of the transmissions and/or channels overlapping one another. Anticipating that collisions may sometimes occur, rules have been developed to provide guidance for how to handle certain transmissions in the event of a collision. One example set of rules includes a set of rules for handling the transmission of uplink control information (UCI), referred to herein as one or more UCI multiplexing rules. However, the UCI multiplexing rules generally only apply if certain conditions are first met. If the conditions are not met, the rules would normally not apply, and an error condition may result. For example, in the case that just one pair of overlapping channels does not meet timeline requirements of the UCI multiplexing rules, the UE may designate the uplink transmission as an error case for all uplink channels in the group of overlapping channels and the UE behavior may not be specified. This could result in additional latency or delay for transmissions associated with a service type that calls for low latency and/or high reliability, as these transmissions may also be dropped. Thus, even though the UCI multiplexing rule is intended to avoid collisions through scheduling, this method may actually increase latency for some channels.

In one solution, UCI multiplexing may be applied even when the conditions of the UCI multiplexing rules are not met. UCI multiplexing may be applied on priority channels (for example, ultra-reliable, low-latency communications (URLLC) channels). Transmissions on lower priority channels may be dropped. Thus, a UE may determine a priority of the overlapping channels, and then communicate on the highest priority channels. The UE may do so outside of a UCI multiplexing context, and may apply prioritization rules, based on service type, for example, to various situations where uplink transmissions overlap.

A method of wireless communication at a UE is described. The method may include identifying that the UE is scheduled to transmit on a first channel associated with a first service type, identifying that the UE is scheduled to transmit on a second channel associated with a second service type, and that the second channel is scheduled to at least partially overlap with the first channel, determining that one of the first channel or the second channel is a higher priority channel based on respective priorities of the first service type and the second service type, and transmitting a message on the higher priority channel.

An apparatus for wireless communication at a UE is described. The apparatus may include a processor, memory coupled with the processor, and instructions stored in the memory. The instructions may be executable by the processor to cause the apparatus to identify that the UE is scheduled to transmit on a first channel associated with a first service type, identify that the UE is scheduled to transmit on a second channel associated with a second service type, and that the second channel is scheduled to at least partially overlap with the first channel, determine that one of the first channel or the second channel is a higher priority channel based on respective priorities of the first service type and the second service type, and transmit a message on the higher priority channel.

Another apparatus for wireless communication at a UE is described. The apparatus may include means for identifying that the UE is scheduled to transmit on a first channel associated with a first service type, identifying that the UE is scheduled to transmit on a second channel associated with a second service type, and that the second channel is scheduled to at least partially overlap with the first channel, determining that one of the first channel or the second channel is a higher priority channel based on respective priorities of the first service type and the second service type, and transmitting a message on the higher priority channel.

A non-transitory computer-readable medium storing code for wireless communication at a UE is described. The code may include instructions executable by a processor to identify that the UE is scheduled to transmit on a first channel associated with a first service type, identify that the UE is scheduled to transmit on a second channel associated with a second service type, and that the second channel is scheduled to at least partially overlap with the first channel, determine that one of the first channel or the second channel is a higher priority channel based on respective priorities of the first service type and the second service type, and transmit a message on the higher priority channel.

Some examples of the method, apparatuses, and non-transitory computer-readable medium described herein may further include operations, features, means, or instructions for determining that the UE may be to transmit on only one of the first channel or the second channel based on the second channel being scheduled to at least partially overlap with the first channel and based on a predetermined condition.

In some examples of the method, apparatuses, and non-transitory computer-readable medium described herein, determining that the UE may be to transmit on only one of the first channel or the second channel based on a predetermined condition may include operations, features, means, or instructions for identifying a set of uplink control information multiplexing rules that define conditions for multiplexing uplink control information on a single channel when multiple channels overlap and determining that the set of uplink control information multiplexing rules may be not satisfied.

In some examples of the method, apparatuses, and non-transitory computer-readable medium described herein, determining that the UE may be to transmit on only one of the first channel or the second channel based on a predetermined condition may include operations, features, means, or instructions for determining that the UE supports simultaneous transmission of partially overlapping channels and determining that the UE may be power-limited.

Some examples of the method, apparatuses, and non-transitory computer-readable medium described herein may further include operations, features, means, or instructions for determining that the UE supports simultaneous transmission of partially overlapping channels, determining that the UE may be power-limited and where transmitting the message on the higher priority channel includes transmitting the message using a transmission power that may be greater than other transmission powers used for other simultaneous transmissions on channels that partially overlap with the higher priority channel, based on the UE being power-limited.

Some examples of the method, apparatuses, and non-transitory computer-readable medium described herein may further include operations, features, means, or instructions for identifying that the UE may be scheduled to transmit on a third channel that at least partially overlaps with both the first channel and the second channel, where the third channel may be associated with a service type that may be not the same as the service type of the higher priority channel.

Some examples of the method, apparatuses, and non-transitory computer-readable medium described herein may further include operations, features, means, or instructions for determining that a timeline for each of the first channel, the second channel, and the third channel satisfies a set of uplink control information multiplexing rules that define conditions for multiplexing uplink control information on a single channel when multiple channels overlap and determining that the UE may be to transmit uplink control information for each of the first channel, the second channel, and the third channel on the higher priority channel.

Some examples of the method, apparatuses, and non-transitory computer-readable medium described herein may further include operations, features, means, or instructions for determining that a timeline for some, but not all, of the first channel, the second channel, and the third channel satisfies a set of uplink control information multiplexing rules that define conditions for multiplexing uplink control information on a single channel when multiple channels overlap, with the higher priority channel being one of the channels whose timeline satisfies the set of uplink control information multiplexing rules and determining that the UE may be to transmit uplink control information on the higher priority channel for only the some of the channels that satisfy the set of uplink control information multiplexing rules.

Some examples of the method, apparatuses, and non-transitory computer-readable medium described herein may further include operations, features, means, or instructions for determining that a timeline for none of the first channel, the second channel, or the third channel satisfies a set of uplink control information multiplexing rules that define conditions for multiplexing uplink control information on a single channel when multiple channels overlap and dropping transmission of all uplink control information associated with channels other than the higher priority channel.

Some examples of the method, apparatuses, and non-transitory computer-readable medium described herein may further include operations, features, means, or instructions for dropping all lower priority channels regardless of satisfying the timeline, where the lower priority channels may be eMBB channels.

Some examples of the method, apparatuses, and non-transitory computer-readable medium described herein may further include operations, features, means, or instructions for identifying that the UE may be scheduled to transmit on a third channel that at least partially overlaps with both the first channel and the second channel, where the third channel may be associated with a service type that may be the same as the service type of the higher priority channel.

Some examples of the method, apparatuses, and non-transitory computer-readable medium described herein may further include operations, features, means, or instructions for determining that a timeline for each of the first channel, the second channel, and the third channel satisfies a set of uplink control information multiplexing rules that define conditions for multiplexing uplink control information on a single channel when multiple channels overlap and determining that the UE may be to transmit uplink control information for each of the first channel, the second channel, and the third channel on at least one of the higher priority channel and the third channel.

Some examples of the method, apparatuses, and non-transitory computer-readable medium described herein may further include operations, features, means, or instructions for determining that a timeline for some, but not all, of the first channel, the second channel, and the third channel satisfies a set of uplink control information multiplexing rules that define conditions for multiplexing uplink control information on a single channel when multiple channels overlap, with the higher priority channel being one of the channels whose timeline satisfies the set of uplink control information multiplexing rules, re-determining the higher priority channel from the first channel, the second channel, and the third channel based on respective priorities of the first service type and the second service type and a tie-breaking priority rule and determining that the UE may be to transmit uplink control information on the higher priority channel for only some of the channels that satisfy the set of uplink control information multiplexing rules.

In some examples of the method, apparatuses, and non-transitory computer-readable medium described herein, the tie-breaking priority rule may be based on a modulation and coding scheme or channel quality indicator used by each channel, timing parameters pertaining to timing durations between scheduled uplink channels and downlink channels associated with and preceding the scheduled uplink channels, associated search spaces, control resource sets, or bandwidth part indices, component carrier indices, associated radio network temporary identifiers, uplink control information content on the channels, or combinations thereof.

Some examples of the method, apparatuses, and non-transitory computer-readable medium described herein may further include operations, features, means, or instructions for determining that a timeline for none of the first channel, the second channel, or the third channel satisfies a set of uplink control information multiplexing rules that define conditions for multiplexing uplink control information on a single channel when multiple channels overlap and dropping transmission of all uplink control information associated with channels other than the higher priority channel.

Some examples of the method, apparatuses, and non-transitory computer-readable medium described herein may further include operations, features, means, or instructions for determining that one of the first channel or the second channel may be the higher priority channel may be based on an indication field in downlink control information, a search space or control resource set, a bandwidth part, a radio network temporary identifier masking, physical downlink control channel scrambling, or combinations thereof.

Some examples of the method, apparatuses, and non-transitory computer-readable medium described herein may further include operations, features, means, or instructions for determining that one of the first channel or the second channel may be the higher priority channel may be based on a block error rate associated with a channel state information process to be reported, association with downlink control information detected via a priority-based radio network temporary identifier, use of a priority-based channel quality indicator table, timing parameters pertaining to timing durations between scheduled uplink channels and downlink channels associated with and preceding the scheduled uplink channels, or combinations thereof.

In some examples of the method, apparatuses, and non-transitory computer-readable medium described herein, the first service type and the second service type may be one of an enhanced mobile broadband (eMBB) service or an ultra-reliable low-latency communications (URLLC) service.

In some examples of the method, apparatuses, and non-transitory computer-readable medium described herein, the first service type and the second service type may be different classes of an URLLC service.

A method of wireless communication at a base station is described. The method may include scheduling transmission on a first channel associated with a first service type, scheduling transmission on a second channel associated with a second service type, where the second channel is scheduled to at least partially overlap with the first channel and scheduling transmission on the second channel is based on a predetermined condition, and receiving a higher priority channel, where the higher priority channel is based on respective priorities of the first service type and the second service type determined by the UE.

An apparatus for wireless communication at a base station is described. The apparatus may include a processor, memory coupled with the processor, and instructions stored in the memory. The instructions may be executable by the processor to cause the apparatus to schedule transmission on a first channel associated with a first service type, schedule transmission on a second channel associated with a second service type, where the second channel is scheduled to at least partially overlap with the first channel and scheduling transmission on the second channel is based on a predetermined condition, and receive a higher priority channel, where the higher priority channel is based on respective priorities of the first service type and the second service type determined by the UE.

Another apparatus for wireless communication at a base station is described. The apparatus may include means for scheduling transmission on a first channel associated with a first service type, scheduling transmission on a second channel associated with a second service type, where the second channel is scheduled to at least partially overlap with the first channel and scheduling transmission on the second channel is based on a predetermined condition, and receiving a higher priority channel, where the higher priority channel is based on respective priorities of the first service type and the second service type determined by the UE.

A non-transitory computer-readable medium storing code for wireless communication at a base station is described. The code may include instructions executable by a processor to schedule transmission on a first channel associated with a first service type, schedule transmission on a second channel associated with a second service type, where the second channel is scheduled to at least partially overlap with the first channel and scheduling transmission on the second channel is based on a predetermined condition, and receive a higher priority channel, where the higher priority channel is based on respective priorities of the first service type and the second service type determined by the UE.

In some examples of the method, apparatuses, and non-transitory computer-readable medium described herein, the first service type and the second service type may be one of an enhanced mobile broadband (eMBB) service or an URLLC service.

In some examples of the method, apparatuses, and non-transitory computer-readable medium described herein, scheduling transmission on the second channel based on a predetermined condition may include operations, features, means, or instructions for identifying a set of uplink control information multiplexing rules that define conditions for multiplexing uplink control information on a single channel when multiple channels overlap.

Some examples of the method, apparatuses, and non-transitory computer-readable medium described herein may further include operations, features, means, or instructions for receiving uplink control information on the higher priority channel for a set of the channels that satisfy the set of uplink control information multiplexing rules.

Some examples of the method, apparatuses, and non-transitory computer-readable medium described herein may further include operations, features, means, or instructions for receiving a transmission on a channel with reduced power.

In some examples of the method, apparatuses, and non-transitory computer-readable medium described herein, the first channel and the second channel may be one of a physical uplink control channel (PUCCH) or a physical uplink shared channel (PUSCH) channel.

DETAILED DESCRIPTION

In some cases, wireless communication systems may schedule communication resources to support both uplink and downlink transmissions. For example, a wireless communication system may allocate a set of resources to uplink transmissions. In one example, a base station may schedule overlapping transmissions on multiple channels. Once the user equipment (UE) transmits or uplinks to the base station, a collision may result as a result of the transmissions and/or channels overlapping one another. Anticipating that collisions may sometimes occur, rules have been developed to provide guidance for how to handle certain transmissions in the event of a collision. One example set of rules includes a set of rules for handling the transmission of uplink control information (UCI), referred to herein as one or more UCI multiplexing rules. However, the UCI multiplexing rules generally only apply if certain conditions are first met. If the conditions are not met, the rules would normally not apply, and an error condition may result. For example, in the case that just one pair of overlapping channels does not meet timeline requirements of the UCI multiplexing rules, the UE may designate the uplink transmission as an error case for all uplink channels in the group of overlapping channels and the UE behavior may not be specified. This could result in additional latency or delay for transmissions associated with a service type that calls for low latency and/or high reliability, as these transmissions may also be dropped. Thus, even though the UCI multiplexing rule is intended to avoid collisions through scheduling, this method may actually increase latency for some channels.

In one solution, UCI multiplexing may be applied even when the Conditions of the UCI multiplexing rules are not met. UCI multiplexing may be applied on priority channels (for example, ultra-reliable, low-latency communications (URLLC) channels). Transmissions on lower priority channels may be dropped. Thus, a UE may determine a priority of the overlapping channels, and then communicate on the highest priority channel(s). The UE may do so outside of a UCI multiplexing context, and may apply prioritization rules, based on service type, for example, to various situations where uplink transmissions overlap. If the overlapping channels have the same priority, the timeline requirements must be met for UCI multiplexing, or the result is an error case. Across different priorities, however, the timeline does not need to be satisfied.

Aspects of the disclosure are initially described in the context of a wireless communications system. Aspects of the disclosure are further illustrated by timelines implemented by a communications system. Aspects of the disclosure are further illustrated by and described with reference to control channel configurations, apparatus diagrams, system diagrams, and flowcharts that relate to uplink collision handling for wireless communication systems.

Figure 1:
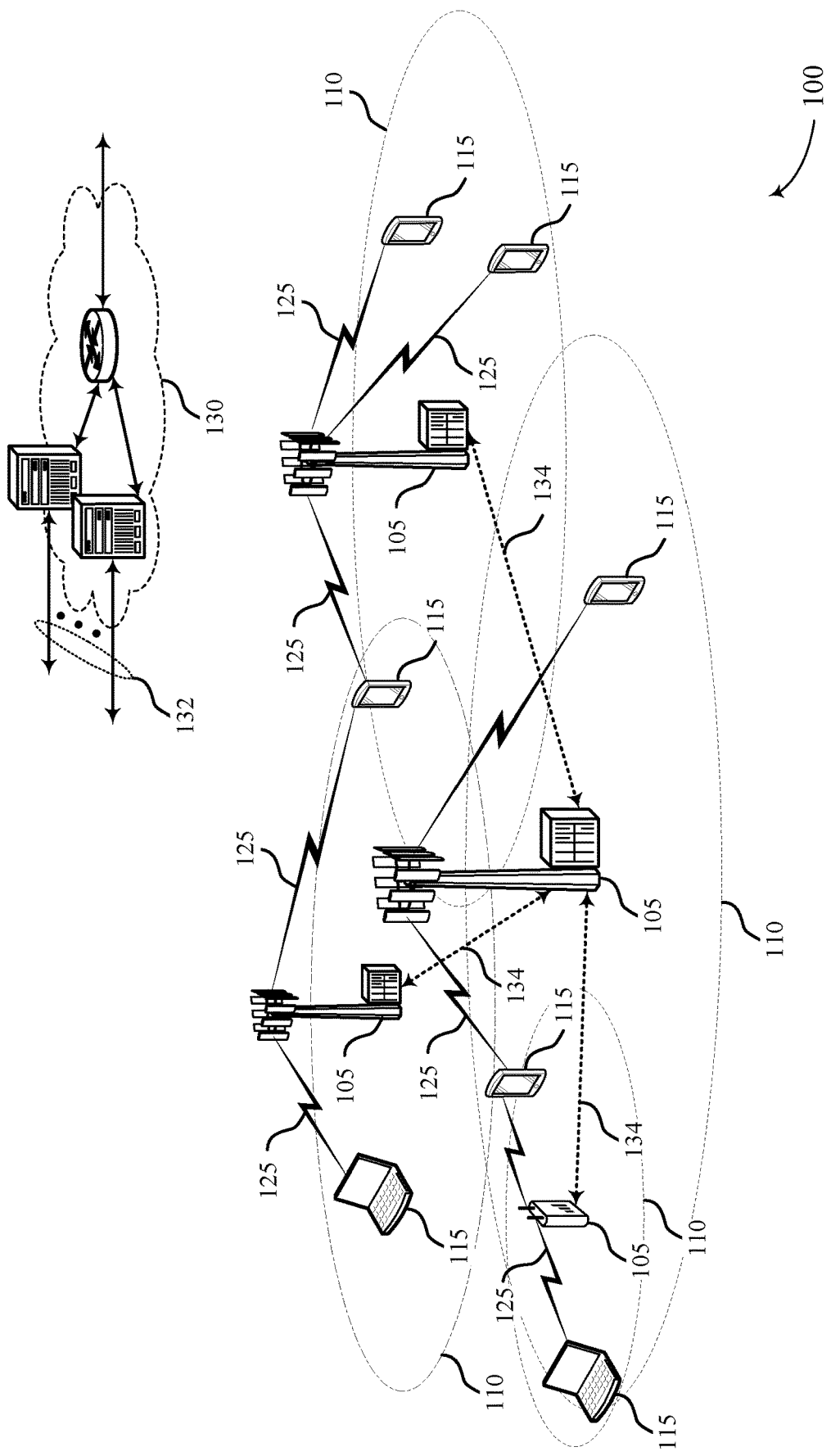
FIG. 1 illustrates an example of a system for uplink collision handling for a wireless communication system in accordance with aspects of the present disclosure.

FIG. 1 illustrates an example of a wireless communications system 100 that supports uplink collision handling for a wireless communication system in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency-division multiplexing (OFDM) or discrete Fourier transform-spread OFDM (DFT-s-OFDM)).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, wireless communication systems may schedule communication resources to support both uplink and downlink transmissions. For example, a wireless communication system may allocate a set of resources to uplink transmissions. In one example, a base station may schedule overlapping transmissions on multiple channels. Once the user equipment (UE) transmits or uplinks to the base station, a collision may result as a result of the transmissions and/or channels overlapping one another. Anticipating that collisions may sometimes occur, rules have been developed to provide guidance for how to handle certain transmissions in the event of a collision.

One example set of rules includes a set of rules for handling the transmission of uplink control information (UCI), referred to herein as one or more UCI multiplexing rules. However, the UCI multiplexing rules generally only apply if certain conditions are first met. If the conditions are not met, the rules would normally not apply, and an error condition may result. For example, in the case that just one pair of overlapping channels does not meet timeline requirements of the UCI multiplexing rules, the UE may designate the uplink transmission as an error case for all uplink channels in the group of overlapping channels and the UE behavior may not be specified. This could result in additional latency or delay for transmissions associated with a service type that calls for low latency and/or high reliability, as these transmissions may also be dropped. Thus, even though the UCI multiplexing rule is intended to avoid collisions through scheduling, this method may actually increase latency for some channels.

Figure 2:
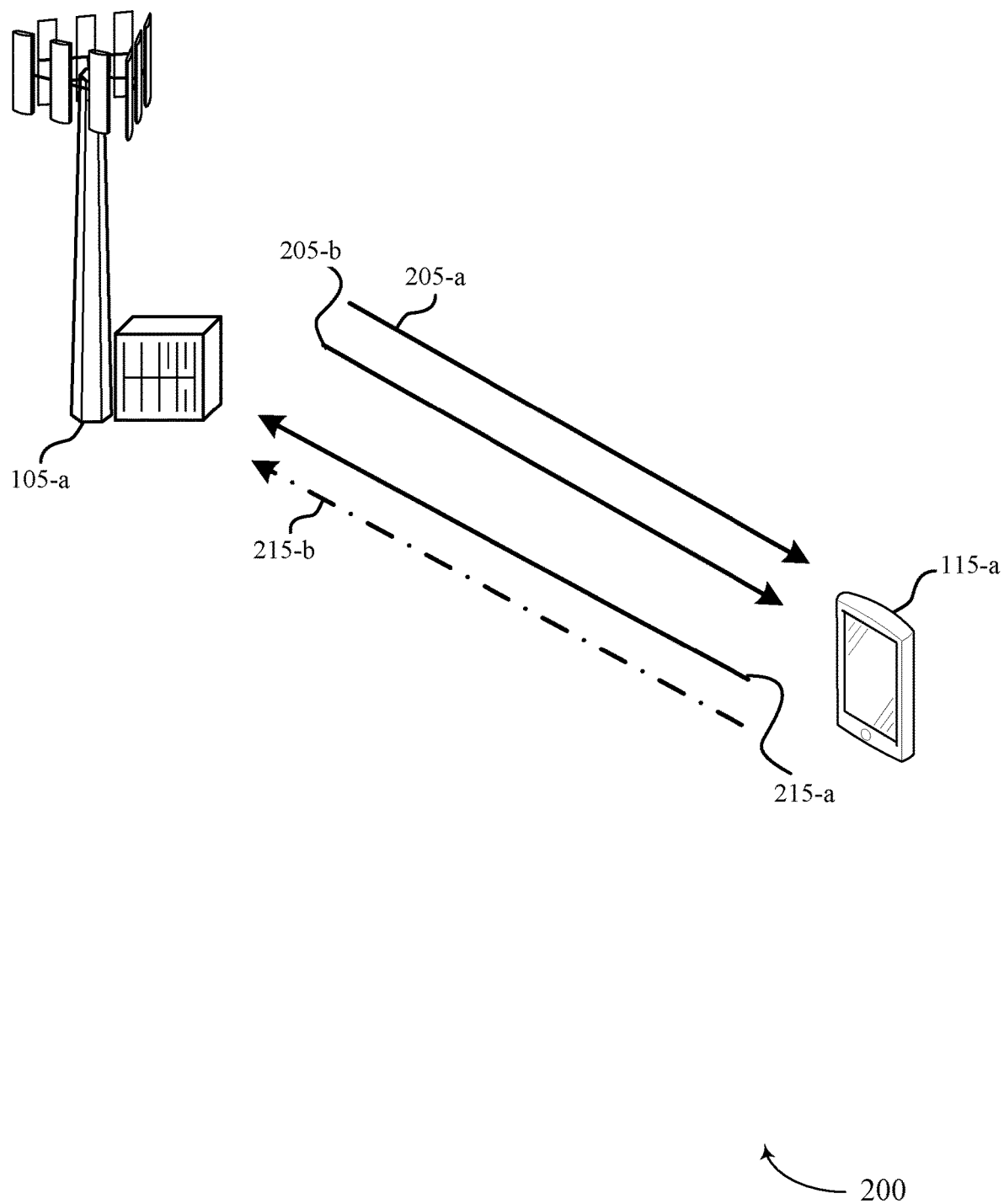
FIG. 2 illustrates an example of uplink collision handling for a wireless communication system in accordance with aspects of the present disclosure.

FIG. 2 illustrates an example of uplink collision handling for a wireless communication system in accordance with aspects of the present disclosure. In some examples, wireless communications system 200 may implement aspects of wireless communication system 100. The wireless communications system 200 may include UE 115-a and base station 105-a, which may be examples of the UE 115 and base station 105 described with reference to FIG. 1. As shown, UE 115-a may communicate with base station 105-a via uplinks 215-a and 215-b. Further, base station 105-a may communicate with UE 115-a via downlinks 205-a and 205-b.

In some cases, a base station 105 (e.g., base station 105-a) may transmit control information indicating the scheduled and allocated resources in a downlink transmission over downlinks 205-a and 205-b, to the UE 115-a. For example, the base station 105 may transmit downlink control information (DCI) on a downlink control channel, such as a physical downlink control channel (PDCCH). In some examples, the base station 105 may transmit UE-specific scheduling assignments for downlink resource allocation, uplink grants, physical random access channel (PRACH) responses, uplink power control commands, and common scheduling assignments for signaling messages (e.g., such as system information) on the PDCCH. The base station 105 may transmit the control information during one or more symbols within a given TTI (e.g., a slot, a mini-slot, an sTTI).

In some cases, the base station 105 (e.g., base station 105-a) may transmit control information associated with a first scheduled uplink transmission. The control information may be transmitted via downlink 205-a. Additionally, the base station 105 (e.g., base station 105-a) may also transmit different control information via downlink 205-b. In some cases, the control information of downlink 205-a may include scheduling information for uplink 215-a, while the control information of downlink 205-b may include scheduling information for uplink 215-b. In one example, the uplinks 215-a and 215-b may be scheduled to include uplink control information. In many cases, uplinks 215-a and 215-b can be scheduled so as to not overlap. In those instances, the uplink control information that is scheduled for each uplink 215-a, 215-b may be transmitted. However, in some instances, uplinks 215-a and 215-b are scheduled so as to overlap. In such situations, a UCI multiplexing rule has been adopted to allow the UE 115-a to determine when and how to multiplex the scheduled UCI.

In general, the UCI multiplexing rule may be applied when a single-slot PUCCH overlaps with a single-slot PUCCH or overlaps with a single-slot PUSCH in slot n for a PUCCH group. Under the UCI multiplexing rule and corresponding timeline conditions, the UE may multiplex all UCIs on either one PUCCH or one PUSCH so long as the timeline conditions for the UCI multiplexing rules are satisfied. In this case, the timeline conditions set forth that the first symbol of the earliest PUCCH(s)/PUSCH(s) among all the overlapping channels starts no earlier than symbol N1+X after the last symbol of PDSCH(s) and additionally, that the first symbol of the earliest PUCCH(s)/PUSCH(s) among all the overlapping channels starts no earlier than N2+Y, in which N1 and N2 are time periods between channel transmissions and X and Y are non-negative integer values. FIG. 2 illustrates that uplink transmissions are multiplexed via a single uplink (uplink 215-a), while the other uplink (uplink 215-b) is dropped, pursuant to the UCI multiplexing rule.

In FIG. 2, the downlinks 205-a and 205-b may schedule overlapping transmissions of different service types. In one example, the service types may be eMBB and URLLC. As discussed herein, prioritizing methods may be employed to determine a higher priority channel of uplink 215-a and a lower priority channel of uplink 215-b as depicted in FIG. 2. Establishing which channel has a higher priority over another channel may be accomplished in a number of ways. For example, a priority may be determined explicitly and may be based on an indication in a DCI field corresponding to the service of a PDCCH.

Additionally or alternatively, a priority of a channel may be determined based on a search space or control resource set (CORESET) that may be associated with a specific service type. Additionally or alternatively, a priority may be determined based on a bandwidth part (BWP) of a channel, where the BWP may be associated with a specific service type. Additionally or alternatively, a priority may be determined based on a radio network temporary identifier (RNTI) masking associated with the service type. Additionally or alternatively, a priority may be determined based on a scrambling of a downlink control channel (e.g., PDCCH) associated with the service type, or may even be based on a transmission reception point (TRP) identification (ID).

In some cases, a priority may be determined implicitly. For example, UE 115-a may determine a block error rate (BLER) for a channel state calculation. UE 115-a may determine a priority for the channel state calculation based on the determined BLER (e.g., a lower BLER may correspond to a higher priority). In other cases, UE 115-a may determine a priority based on whether a RNTI is configured for a service. For example, a new RNTI for a service may not be configured. In this example, UE 115-a may determine a modulation and coding scheme (MCS) (e.g., 64 QAM) based on a received MCS table. UE 115-a may also detect DCI formats (formats 0_0, 1_0, 0_1, 1_1, etc.) from a UE-specific search space (USS). Based on the detected formats and determined MCS, UE 115-a may determine a priority for a service. In another example, RNTI may be configured for a service. Channel state feedback requests (e.g., DCI messaging) triggering channel state calculations may be scrambled by the configured RNTI. UE 115-a may determine a priority for a service based on the configured RNTI. In yet another example, the priority may be determined based on whether a new channel quality indicator (CQI) table (associated with a higher priority service) is used in reporting channel state information (CSI) on one channel, whether one of the channels follows the cap #2 N1/N2 values, while the other follows cap #1 N1/N2 values, or any combination thereof.

Additionally, the base station 105 may configure a CORESET and search space for transmission of control information (e.g., DCI) to the UE 115-a on a downlink control channel (e.g., downlink 205-a or downlink 205-b). The base station 105-a may configure search space sets according to control channel candidates (e.g., PDCCH candidates) at one or more aggregation levels to use for these DCI transmissions. When configuring a search space set, the base station 105-a may determine a CORESET containing the search space set In each of these explicit and implicit differentiation cases, the PUCCH/PUSCH channel with a lower priority, including the corresponding UCI, may be dropped, or the UCI may be multiplexed onto the PUCCH/PUSCH channel with a higher priority. For example, UE 115-*a* may drop channel state calculations based on the determined priorities.

Dropping may refer to either dropping scheduled channel state calculations, rescheduling channel state calculations (e.g., to another uplink control channel transmission), or stopping the performing of channel state calculations that are in the process of being calculated. In some cases, UE 115-*a* may drop all lower priority channel state calculations and may perform all higher priority channel state calculations. Additionally, the PUCCH/PUSCH channel with a higher priority will be transmitted by the UE 115-*a* and specifically, the UE does not consider this case as an error case.

A prioritization of channels may be useful when multiple PUSCHs and/or PUCCHs overlap or collide. In one example, at least one pair of overlapping channels may not meet timeline requirements of the UCI multiplexing rules described above. Instead of simply declaring an error case, UE 115-*a* may prioritize the channels to determine on which channel UCI is to be multiplexed, and which UCI is to be included.

The idea of prioritizing channels to determine which of overlapping channels is to be transmitted may be extended to more general cases. For example, a UE of multiple UEs may be scheduled across different component carriers (CCs) which may be partially overlapping. Additionally, the UE may not be able to support simultaneous transmission on partially overlapping channels. In this case, the channel with the higher priority should be transmitted and the other lower priority channel, even if transmission of the lower priority channel started earlier, may be dropped. The determination of priority may be determined using the methods discussed with respect to explicit and implicit differentiation, among other methods.

In another example, a UE of multiple UEs may be scheduled across different CCs which may be partially overlapping, but in this case, the UE may support simultaneous transmission of partially overlapping channels, but may be power limited. In this example, the higher priority channel may be transmitted and for all other lower priority channels, either the power may be scaled down, even if scaling down the power may introduce phase continuity, or the transmission of all the other lower priority channels may be stopped or dropped.

In another example, multiple eMBB channels may collide with one or more URLLC channels. In this example, if the timeline requirements are satisfied for all of the channels, then UCI from the eMBB channels may be transmitted on the URLLC channel. Further, to reduce overhead, some contents of the UCI may be piggybacked, for example, hybrid auto repeat request acknowledge (HARQ-ACK) bits. The rest of the contents may be dropped.

Continuing the discussion, in the case that the timeline requirements are satisfied between some of the eMBB channels and the URLLC channel, the eMBB channels that did not satisfy the timeline requirements may be dropped, including the corresponding UCI. The eMBB channels that satisfied the timeline requirements may piggyback the corresponding UCI or some contents of the UCI onto the URLLC channel. Should the timeline requirements not be satisfied between any of the eMBB channels and the URLLC channel, then all eMBB channels, including the corresponding UCI may be dropped and the URLLC channel may be transmitted. In another example, the timeline requirements are satisfied between the eMBB channels and the URLLC channel(s) and the eMBB channel may still be dropped. Additionally, in these examples, the configuration may include a preference for which channel may be dropped in which circumstance.

A further example may include a prioritization scheme in a wireless communication system that includes multiple URLLCs. In the case that all URLLC channels meet the timeline requirements, then the UCI multiplexing rules described above could be applied. However, in the case that the timelines requirements are not met, then an error case may be declared.

Continuing the discussion, in the case that a subset of colliding URLLC channels meet the timeline jointly, one URLLC channel may be a higher priority channel based on another priority rule. This priority rule may be based on which MCS/CQI is being used. For example, new CQI tables may be associated with a higher priority. The priority rule may also be based on making the shorter N1/N2 have a higher priority, the search space/CORESET/BWP index, TRP ID, the CCS index, new RNTI, UCI content on the channels and so forth as previously discussed. In this case, the UCI of other channels may be piggybacked on the higher priority channel.

As explained above, a priority determination for each channel may be based on or associated with a service type of each channel. eMBB and URLLC are two examples of different service types. However, URLLC may include a large spectrum of latency and reliability requirements. Generally, the previously discussed rules may be applied equally to URLLC channels with different requirements. For example, an eMBB service type may be associated with a priority that is less than that of a URLLC0 service type (with latency requirements of 1 ms and a BLER of 10A-5), which may be associated with a priority that is less than that of a URLLC1 (with a latency requirement of 5 ms and a BLER of 10A-6).

Figure 3:
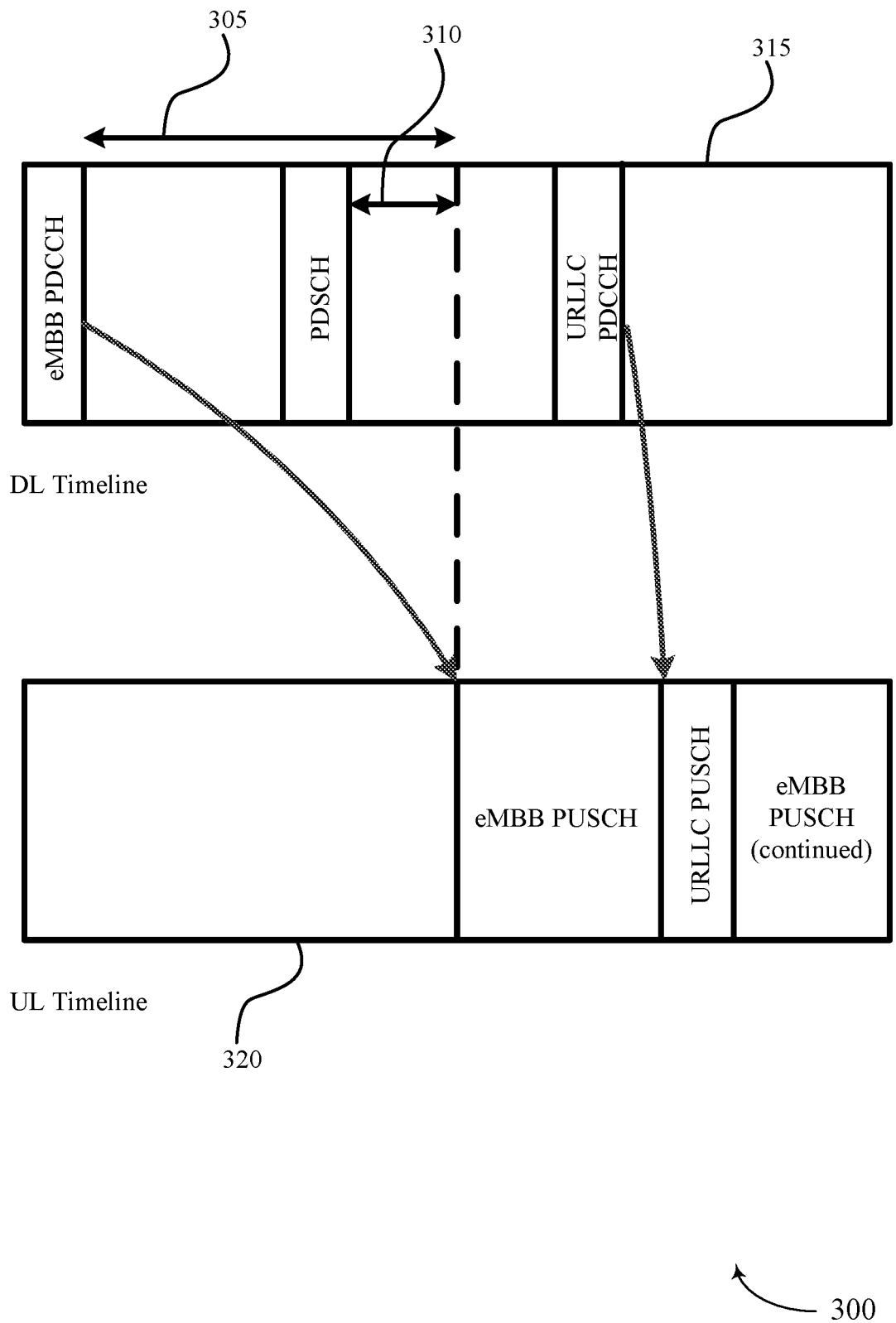
FIG. 3 illustrates an example of a timeline that supports uplink collision handling for a wireless communication system in accordance with aspects of the present disclosure.

FIG. 3 illustrates an example of a timeline 300 that supports uplink collision handling for a wireless communication system in accordance with aspects of the present disclosure. The wireless communication system timeline 300 may include an uplink (UL) timeline 320 and a downlink (DL) timeline 315. The DL timeline 315 of FIG. 3 depicts an eMBB PDCCH, a first time period 305, a PDSCH, and a second time period 310. The first time period 305 may be time period N2 and a second time period 310 which may be time period N1. The first time period 305 or N2 may be a time period that occurs between the last symbol of eMBB PDCCH and the first symbol of the eMBB PUSCH scheduled by the eMBB PDCCH of UL timeline 320, and the second time period 310 or N1 may be a time period that occurs between the last symbol of a physical downlink shared channel (PDSCH) of the DL timeline 315 and the first symbol of the eMBB PUSCH of the UL timeline 320. N1 and N2 are timing parameters that are used in consideration of the UCI multiplexing rules described in connection with FIG. 2.

DL timeline 315 also illustrates the transmission/receipt of a URLLC PDCCH, or other request for a priority response from the UE. The URLLC PDCCH is received during the scheduled eMBB PUSCH, thus resulting in an overlapping schedule. The URLLC PUSCH scheduled by the URLLC PDCCH overlaps with the eMBB PUSCH. As explained above, in these circumstances, where two different channels are scheduled with an overlap, a prioritization of transmissions may occur based at least in part on the service type associated with each channel. As explained above in connection with FIG. 2, the channel on which UCI is multiplexed, and which UCI to include, may be governed by a determination of which PUSCH is of the highest priority. In some instances, when the UE is not capable of supporting simultaneous transmissions, only the highest priority transmission will be maintained, while other lower priority transmissions will be dropped. In other cases, when a UE is capable of simultaneous transmissions, lower priority transmissions may be transmitted with a lower transmission power than that used for higher priority transmissions. Priority of the channels and service types may be determined by any of the discussed methods or any appropriate combinations thereof.

Figure 4:
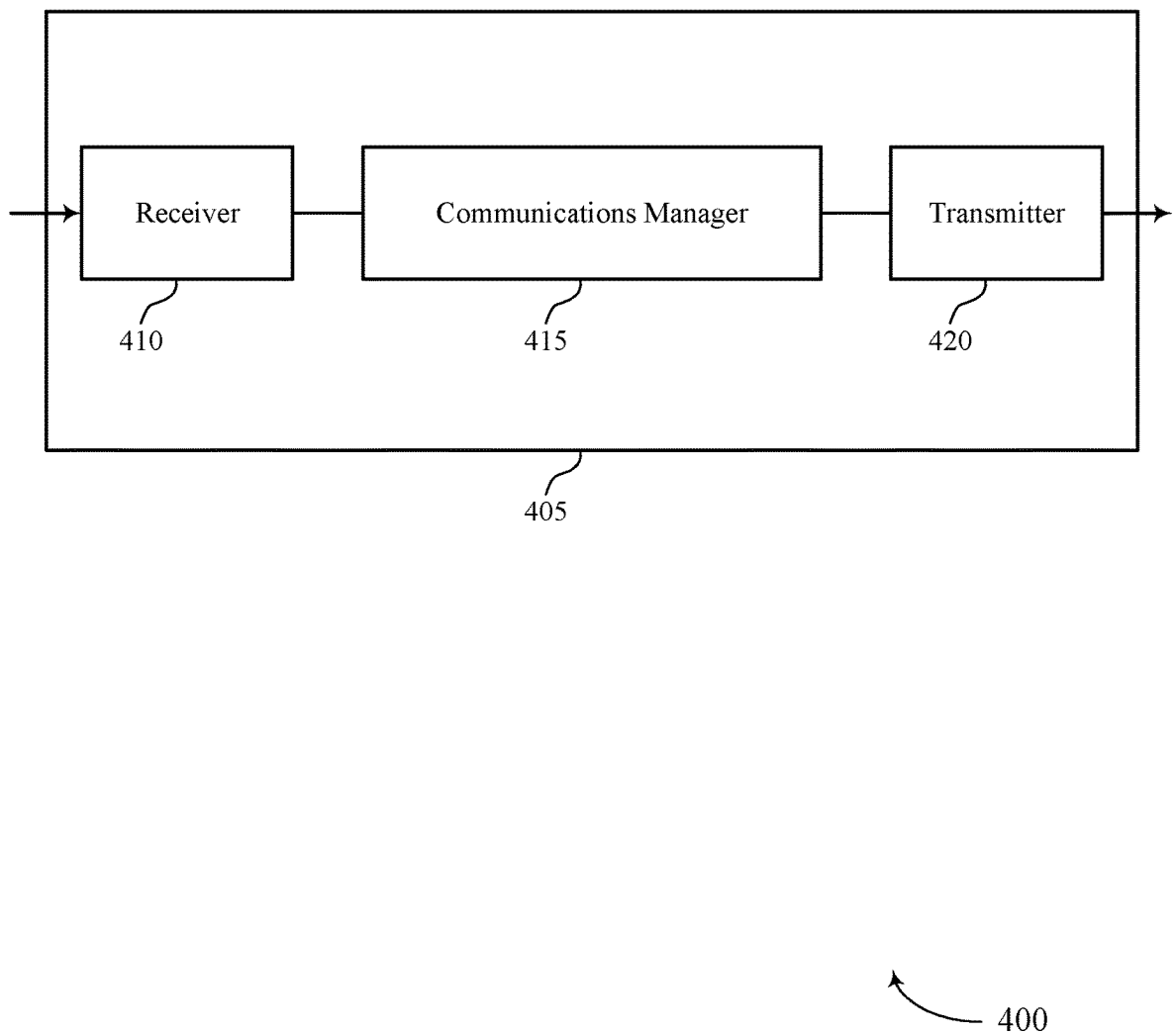
FIGS. 4 and 5 show block diagrams of devices that support uplink collision handling for a wireless communication system in accordance with aspects of the present disclosure.

FIG. 4 shows a block diagram 400 of a device 405 that supports uplink collision handling for a wireless communication service in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to uplink collision handling for a wireless communication system and service types such as URLLC and eMBB, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may identify that the UE is scheduled to transmit on a first channel associated with a first service type, identify that the UE is scheduled to transmit on a second channel associated with a second service type, and that the second channel is scheduled to at least partially overlap with the first channel, determine that one of the first channel or the second channel is a higher priority channel based on respective priorities of the first service type and the second service type, and transmit a message on the higher priority channel. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
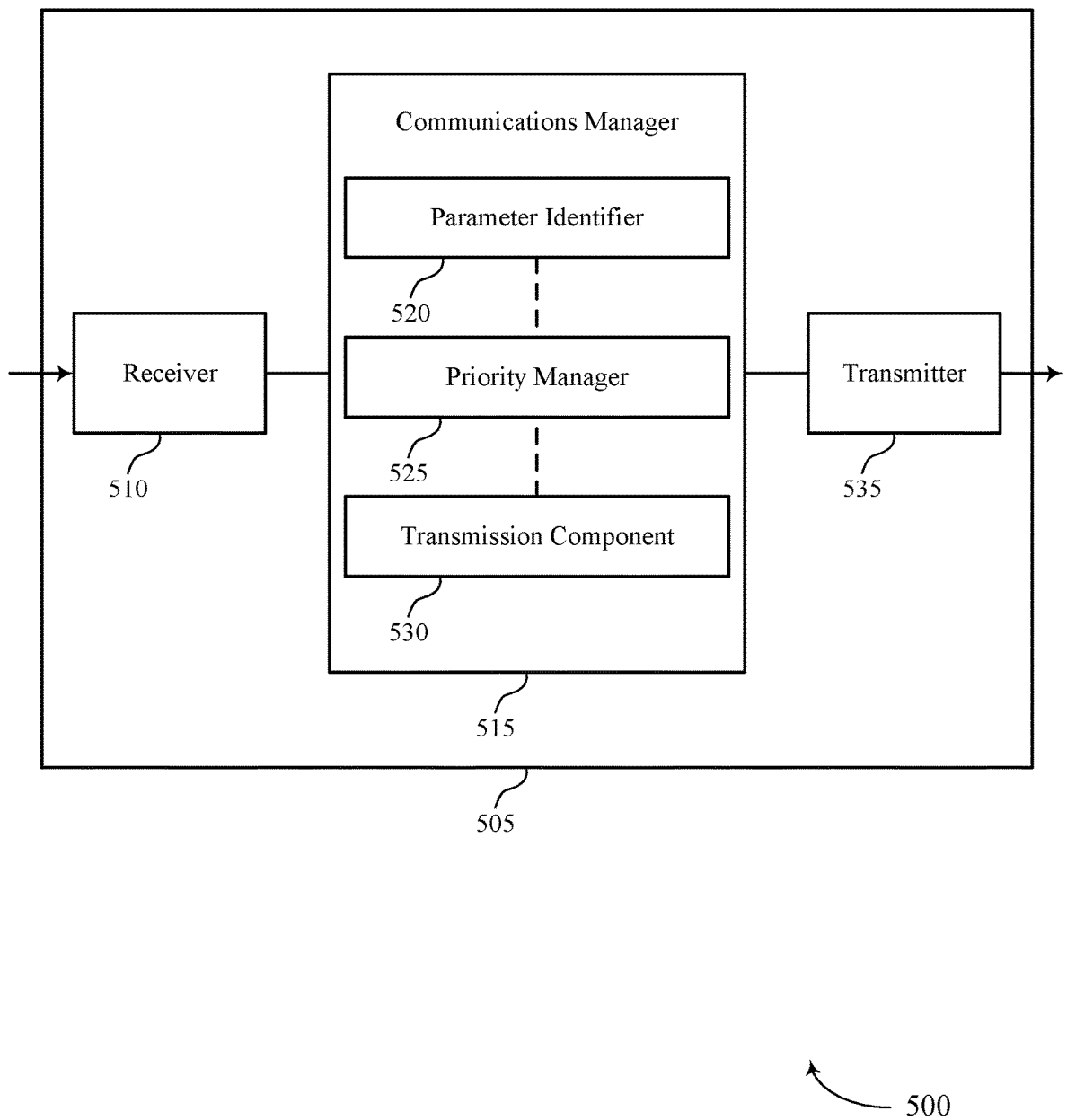

FIG. 5 shows a block diagram 500 of a device 505 that supports uplink collision handling for a wireless communication service in accordance with aspects of the present disclosure. The device 505 may be an example of aspects of a device 405 or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to uplink collision handling for a wireless communication system and service types such as URLLC and eMBB, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a parameter identifier 520, a priority manager 525, and a transmission component 530. The communications manager 515 may be an example of aspects of the communications manager 710 described herein.

The parameter identifier 520 may identify that the UE is scheduled to transmit on a first channel associated with a first service type and identify that the UE is scheduled to transmit on a second channel associated with a second service type, and that the second channel is scheduled to at least partially overlap with the first channel.

The priority manager 525 may determine that one of the first channel or the second channel is a higher priority channel based on respective priorities of the first service type and the second service type.

The transmission component 530 may transmit a message on the higher priority channel.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
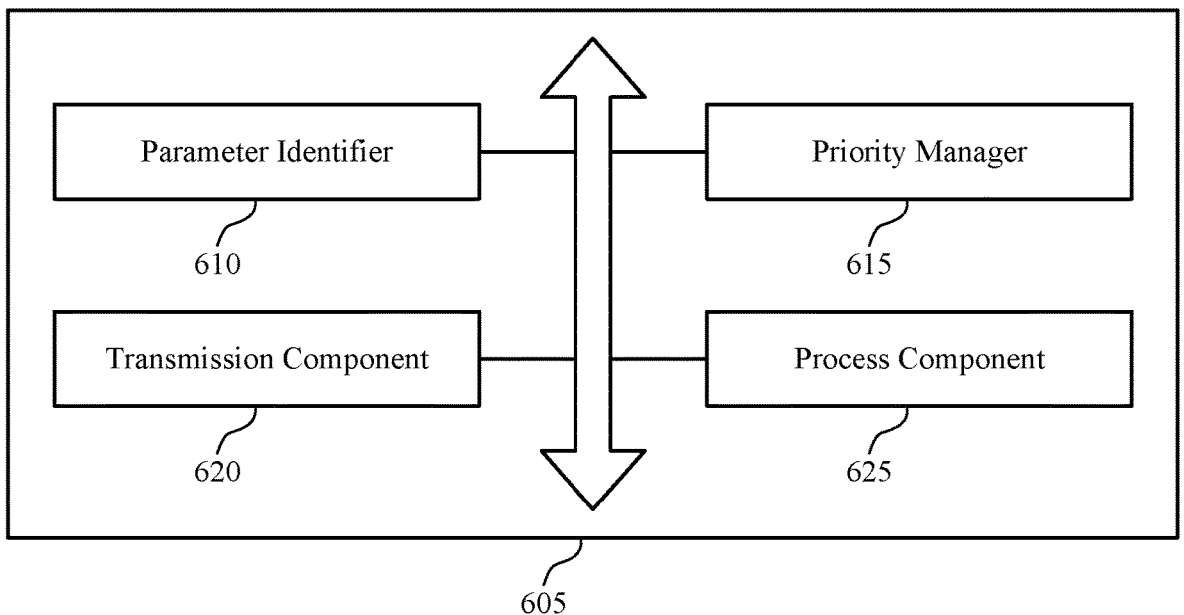
FIG. 6 shows a block diagram of a device that supports uplink collision handling for a wireless communication system in accordance with aspects of the present disclosure.

FIG. 6 shows a block diagram 600 of a communications manager 605 that supports uplink collision handling for a wireless communication service in accordance with aspects of the present disclosure. The communications manager 605 may be an example of aspects of a communications manager 415, a communications manager 515, or a communications manager 710 described herein. The communications manager 605 may include a parameter identifier 610, a priority manager 615, a transmission component 620, and a process component 625. Each of these modules may communicate, directly or indirectly, with one another (e.g., via one or more buses).

The parameter identifier 610 may identify that the UE is scheduled to transmit on a first channel associated with a first service type.

In some examples, the parameter identifier 610 may identify that the UE is scheduled to transmit on a second channel associated with a second service type, and that the second channel is scheduled to at least partially overlap with the first channel.

In some examples, the parameter identifier 610 may identify a set of uplink control information multiplexing rules that define conditions for multiplexing uplink control information on a single channel when multiple channels overlap.

In some examples, the parameter identifier 610 may identify that the UE is scheduled to transmit on a third channel that at least partially overlaps with both the first channel and the second channel, where the third channel is associated with a service type that is not the same as the service type of the higher priority channel.

In some examples, the parameter identifier 610 may identify that the UE is scheduled to transmit on a third channel that at least partially overlaps with both the first channel and the second channel, where the third channel is associated with a service type that is the same as the service type of the higher priority channel.

The priority manager 615 may determine that one of the first channel or the second channel is a higher priority channel based on respective priorities of the first service type and the second service type.

In some examples, the priority manager 615 may determine that the set of uplink control information multiplexing rules are not satisfied.

In some examples, the priority manager 615 may determine that a timeline for each of the first channel, the second channel, and the third channel satisfies a set of uplink control information multiplexing rules that define conditions for multiplexing uplink control information on a single channel when multiple channels overlap.

The transmission component 620 may transmit a message on the higher priority channel.

In some examples, transmitting the message on the higher priority channel may include transmitting the message using a transmission power that is greater than other transmission powers used for other simultaneous transmissions on channels that partially overlap with the higher priority channel, based on the UE being power-limited.

In some examples, the transmission component 620 may determine that the UE is to transmit uplink control information for each of the first channel, the second channel, and the third channel on the higher priority channel.

The process component 625 may determine that the UE is to transmit on only one of the first channel or the second channel based on the second channel being scheduled to at least partially overlap with the first channel and based on a predetermined condition.

In some examples, the process component 625 may determine that the UE supports simultaneous transmission of partially overlapping channels.

In some examples, the process component 625 may determine that the UE is power-limited.

Figure 7:
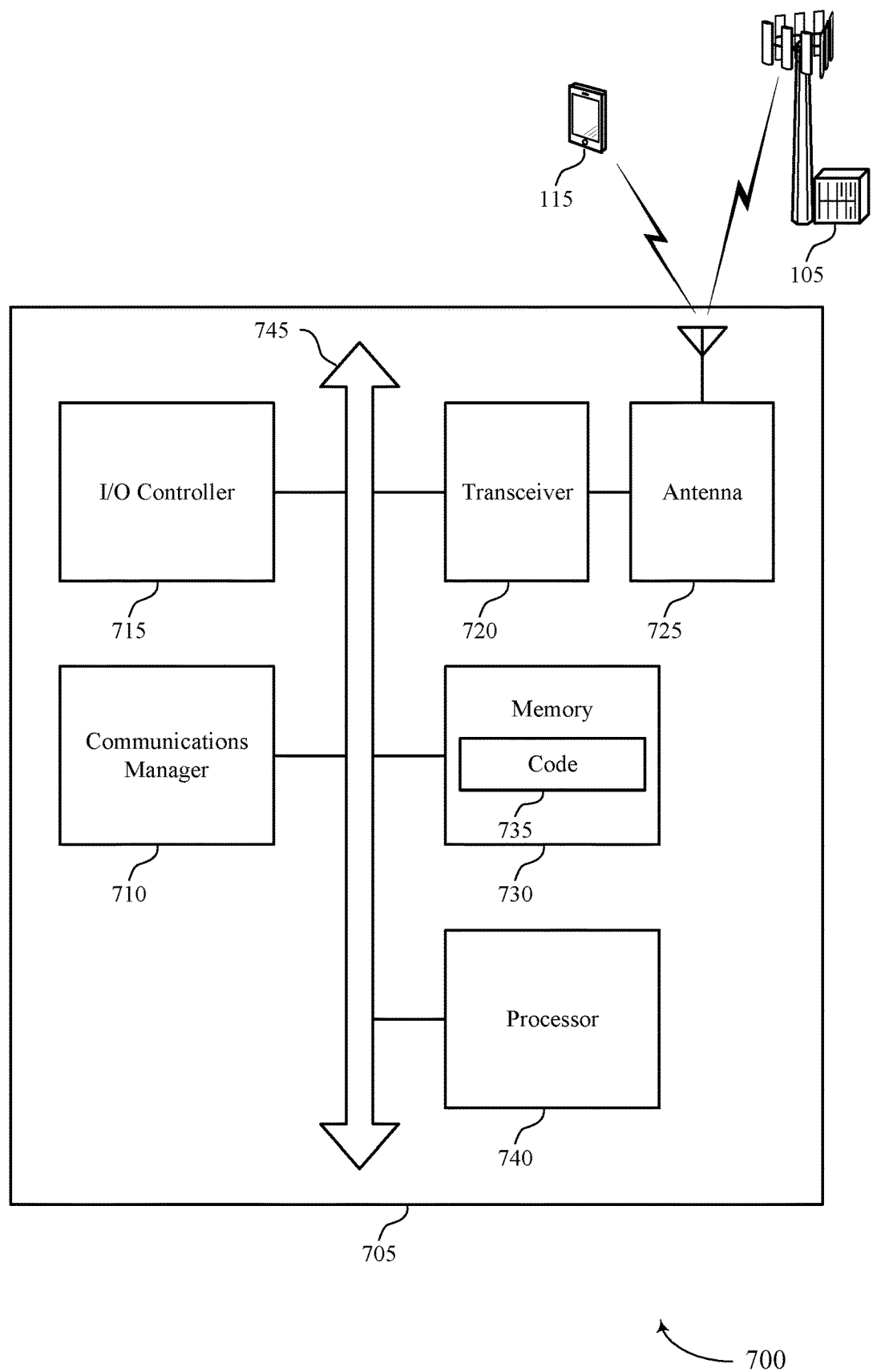
FIG. 7 shows a diagram of a system including a device that supports uplink collision handling for a wireless communication system in accordance with aspects of the present disclosure.

FIG. 7 shows a diagram of a system 700 including a device 705 that supports uplink collision handling a wireless communication service in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may identify that the UE is scheduled to transmit on a first channel associated with a first service type, identify that the UE is scheduled to transmit on a second channel associated with a second service type, and that the second channel is scheduled to at least partially overlap with the first channel, determine that one of the first channel or the second channel is a higher priority channel based on respective priorities of the first service type and the second service type, and transmit a message on the higher priority channel.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic input/output system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting uplink collision handling for a wireless communication system and service types such as URLLC and eMBB).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
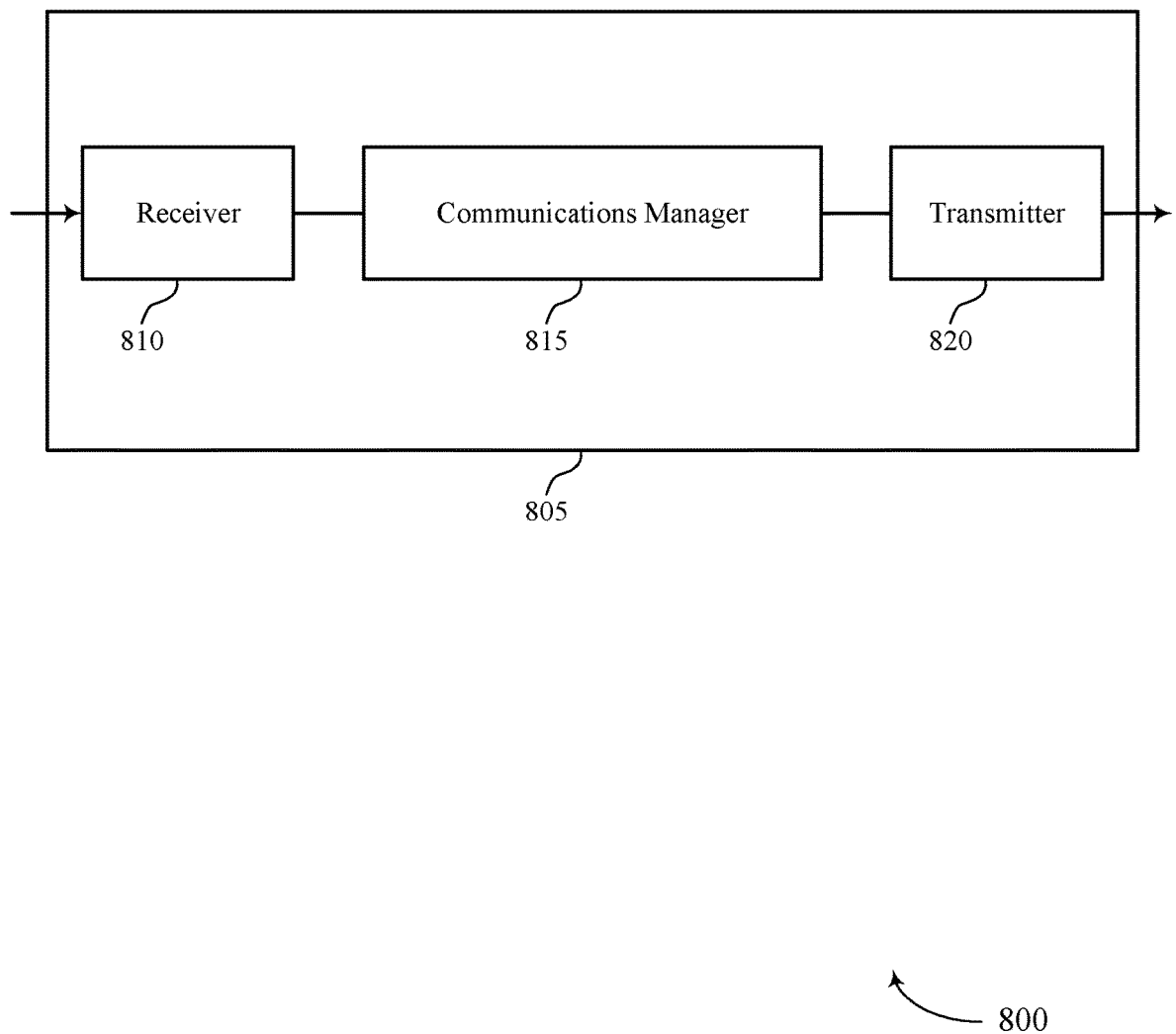
FIGS. 8 and 9 show block diagrams of devices that support uplink collision handling for a wireless communication system in accordance with aspects of the present disclosure.

FIG. 8 shows a block diagram 800 of a device 805 that supports uplink collision handling for a wireless communication service in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to uplink collision handling for a wireless communication system, and a service type such as URLLC and eMBB, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may schedule transmission on a first channel associated with a first service type, schedule transmission on a second channel associated with a second service type, where the second channel is scheduled to at least partially overlap with the first channel and scheduling transmission on the second channel is based on a predetermined condition, and receive a higher priority channel, where the higher priority channel is based on respective priorities of the first service type and the second service type determined by the UE. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
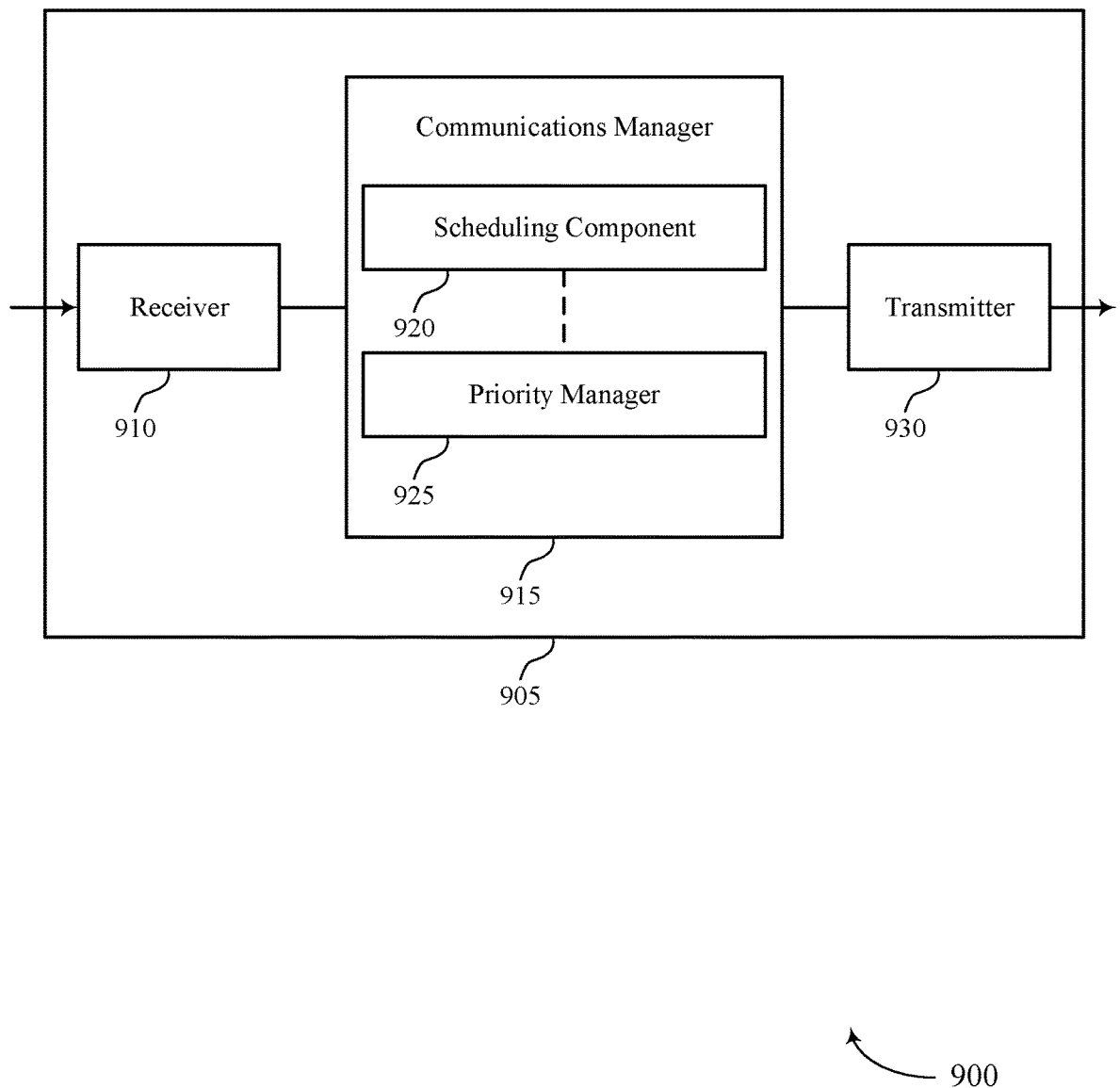

FIG. 9 shows a block diagram 900 of a device 905 that supports uplink collision handling for a wireless communication service in accordance with aspects of the present disclosure. The device 905 may be an example of aspects of a device 805 or a base station 105 as described herein. The device 905 may include a receiver 910, a communications manager 915, and a transmitter 930. The device 905 may also include a processor. Each of these components may be in communication with one another (e.g., via one or more buses).

The receiver 910 may receive information such as packets, user data, or control information associated with various information channels (e.g., control channels, data channels, and information related to uplink collision handling for a wireless communication system and service types such as URLLC and eMBB, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a scheduling component 920 and a priority manager 925. The communications manager 915 may be an example of aspects of the communications manager 815 described herein.

The scheduling component 920 may schedule transmission on a first channel associated with a first service type and schedule transmission on a second channel associated with a second service type, where the second channel is scheduled to at least partially overlap with the first channel and scheduling transmission on the second channel is based on a predetermined condition.

The priority manager 925 may receive a higher priority channel, where the higher priority channel is based on respective priorities of the first service type and the second service type determined by the UE.

The transmitter 930 may transmit signals generated by other components of the device 905. In some examples, the transmitter 930 may be collocated with a receiver 910 in a transceiver module. For example, the transmitter 930 may be an example of aspects of the transceiver 1120 described with reference to FIG. 11. The transmitter 930 may utilize a single antenna or a set of antennas.

Figure 10:
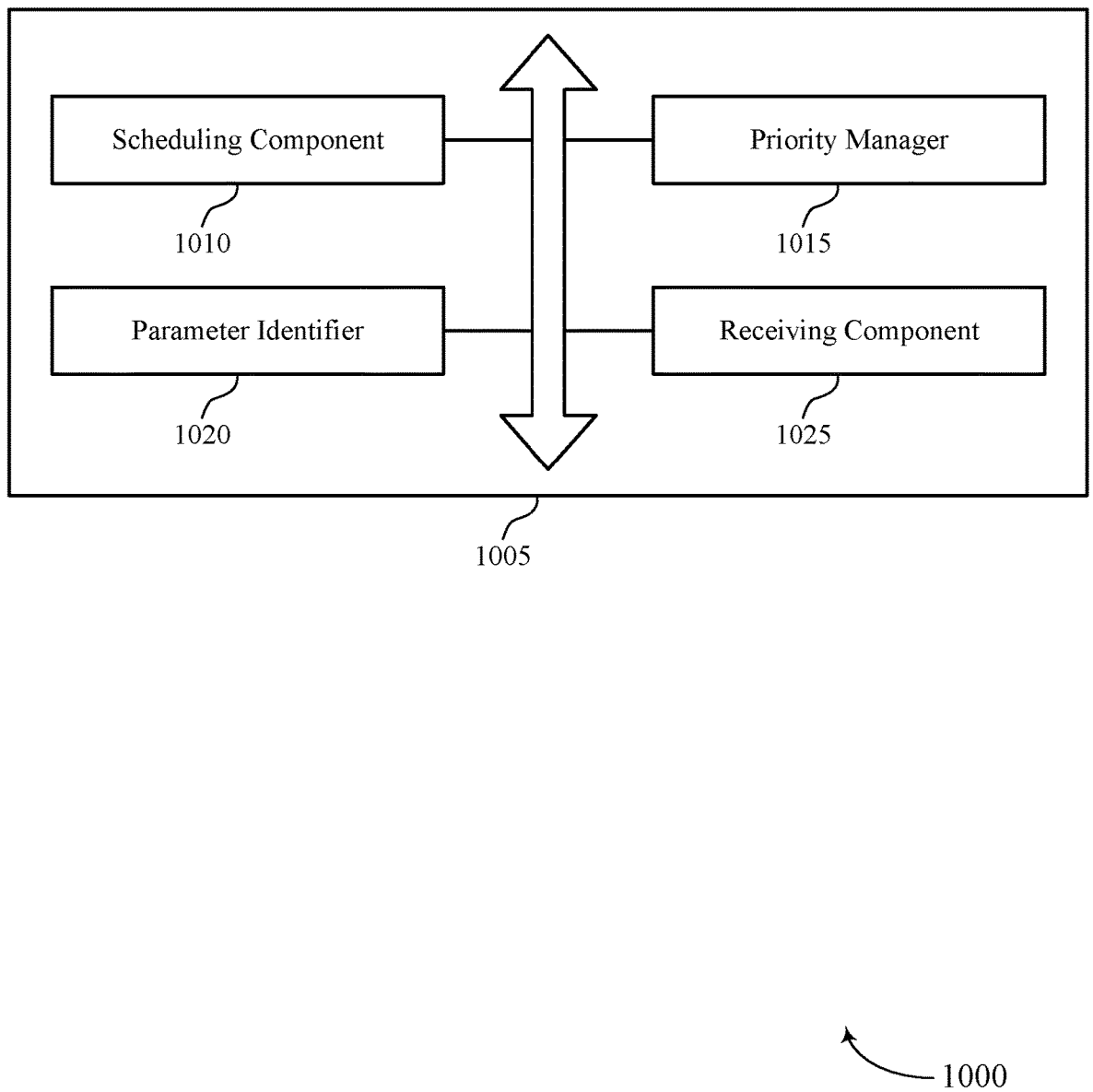
FIG. 10 shows a block diagram of a device that supports uplink collision handling for a wireless communication system in accordance with aspects of the present disclosure.

FIG. 10 shows a block diagram 1000 of a communications manager 1005 that supports uplink collision handling for a wireless communication service in accordance with aspects of the present disclosure. The communications manager 1005 may be an example of aspects of a communications manager 815, a communications manager 915, or a communications manager 1110 described herein. The communications manager 1005 may include a scheduling component 1010, a priority manager 1015, a parameter identifier 1020, and a receiving component 1025. Each of these modules may communicate, directly or indirectly, with one another (e.g., via one or more buses).

The scheduling component 1010 may schedule transmission on a first channel associated with a first service type.

In some examples, the scheduling component 1010 may schedule transmission on a second channel associated with a second service type, where the second channel is scheduled to at least partially overlap with the first channel and scheduling transmission on the second channel is based on a predetermined condition.

The priority manager 1015 may receive a higher priority channel, where the higher priority channel is based on respective priorities of the first service type and the second service type determined by the UE.

The parameter identifier 1020 may identify a set of uplink control information multiplexing rules that define conditions for multiplexing uplink control information on a single channel when multiple channels overlap.

In some cases, the first service type and the second service type are one of an enhanced mobile broadband (eMBB) service or an ultra-reliable low-latency communications (URLLC) service.

In some cases, the first channel and the second channel are one of a PUCCH channel or a PUSCH channel.

The receiving component 1025 may receive uplink control information on the higher priority channel for a set of the channels that satisfy the set of uplink control information multiplexing rules.

In some examples, the receiving component 1025 may receive a transmission on a channel with reduced power.

Figure 11:
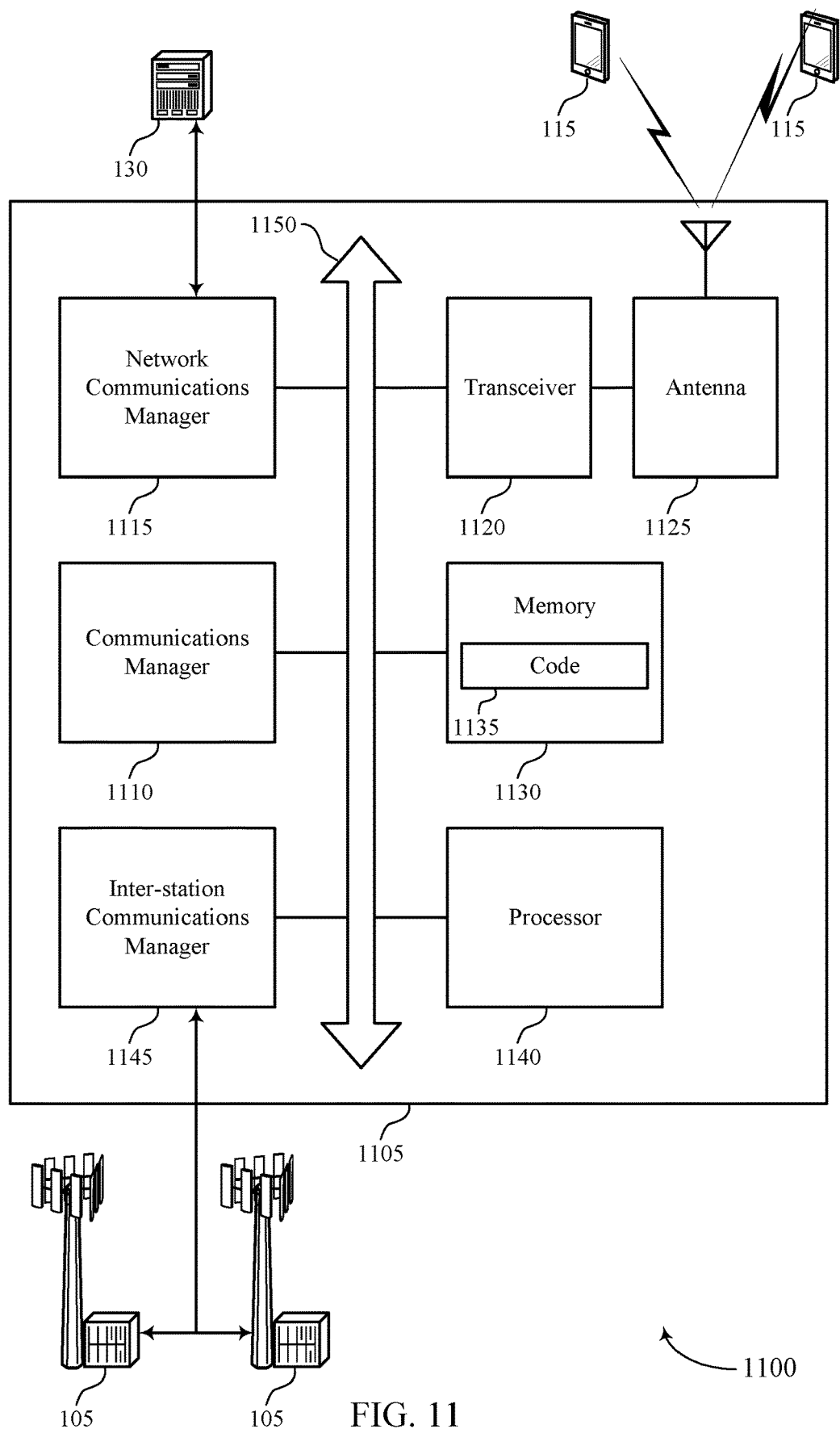
FIG. 11 shows a diagram of a system including a device that supports uplink collision handling for a wireless communication system in accordance with aspects of the present disclosure.

FIG. 11 shows a diagram of a system 1100 including a device 1105 that supports uplink collision handling for a wireless communication service in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may schedule transmission on a first channel associated with a first service type, schedule transmission on a second channel associated with a second service type, where the second channel is scheduled to at least partially overlap with the first channel and scheduling transmission on the second channel is based on a predetermined condition, and receive a higher priority channel, where the higher priority channel is based on respective priorities of the first service type and the second service type determined by the UE.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device to perform various functions (e.g., functions or tasks supporting uplink collision handling for a wireless communication system and service types, including URLLC and eMBB).

The inter-station communications manager 1145 may manage communications with other base station 105 and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
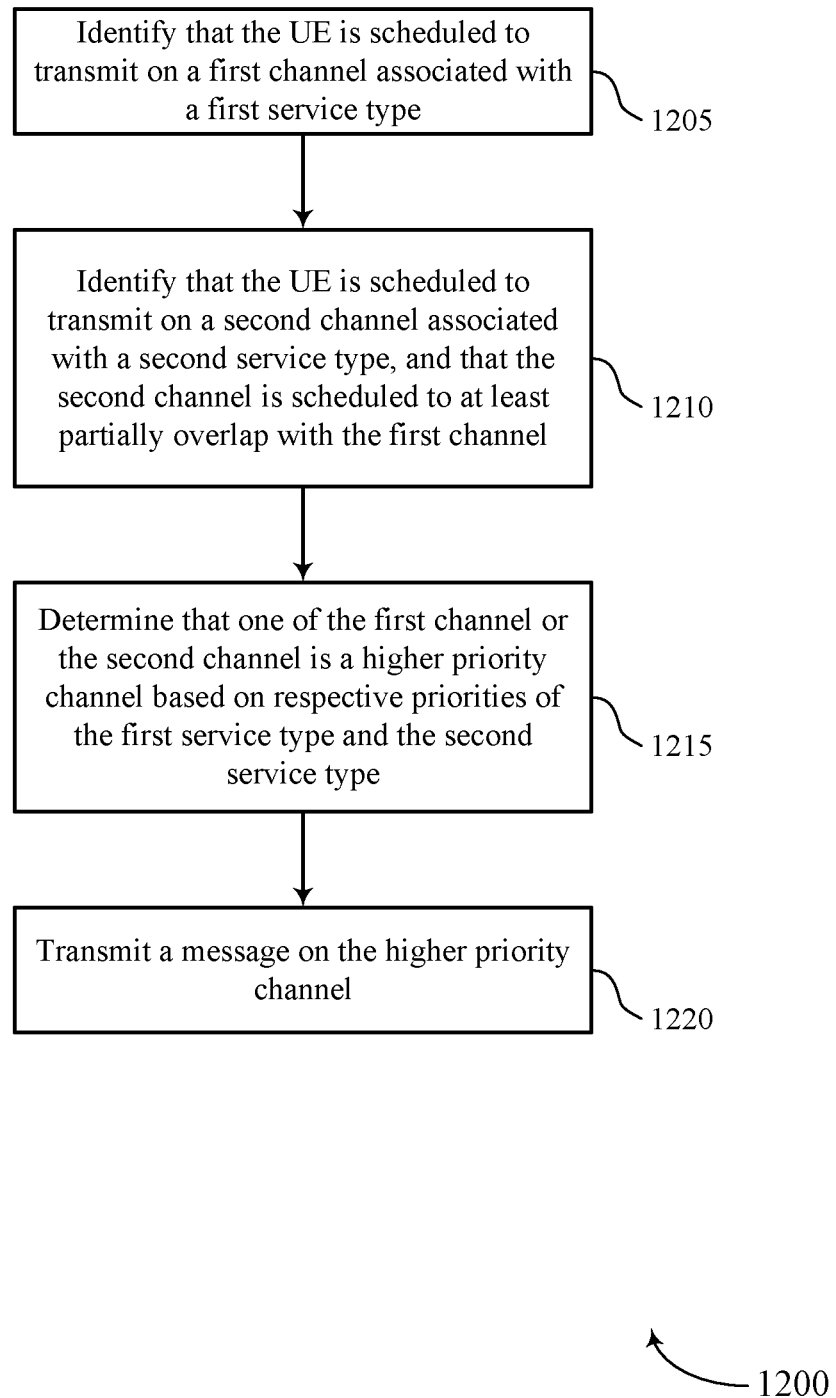
FIGS. 12 through 14 show flowcharts illustrating methods that support uplink collision handling for a wireless communication system in accordance with aspects of the present disclosure.

FIG. 12 shows a flowchart illustrating a method 1200 that supports uplink collision handling for a wireless communication service in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1205, the UE may identify that the UE is scheduled to transmit on a first channel associated with a first service type having a first priority (e.g., first priority channel). The operations of 1205 may be performed according to the methods described herein. In some examples, aspects of the operations of 1205 may be performed by a parameter identifier as described with reference to FIGS. 4 through 7.

At 1210, the UE may identify that the UE is scheduled to transmit on a second channel associated with a second service type having a second priority (e.g., second priority channel), and that the second channel is scheduled to at least partially overlap with the first channel. The operations of 1210 may be performed according to the methods described herein. In some examples, aspects of the operations of 1210 may be performed by a parameter identifier as described with reference to FIGS. 4 through 7.

At 1215, the UE may determine that one of the first channel or the second channel is a higher priority channel based on respective priorities of the first service type and the second service type. The operations of 1215 may be performed according to the methods described herein. In some examples, aspects of the operations of 1215 may be performed by a priority manager as described with reference to FIGS. 4 through 7.

At 1220, the UE may transmit a message on the higher priority channel. The operations of 1220 may be performed according to the methods described herein. In some examples, aspects of the operations of 1220 may be performed by a transmission component as described with reference to FIGS. 4 through 7.

Figure 13:
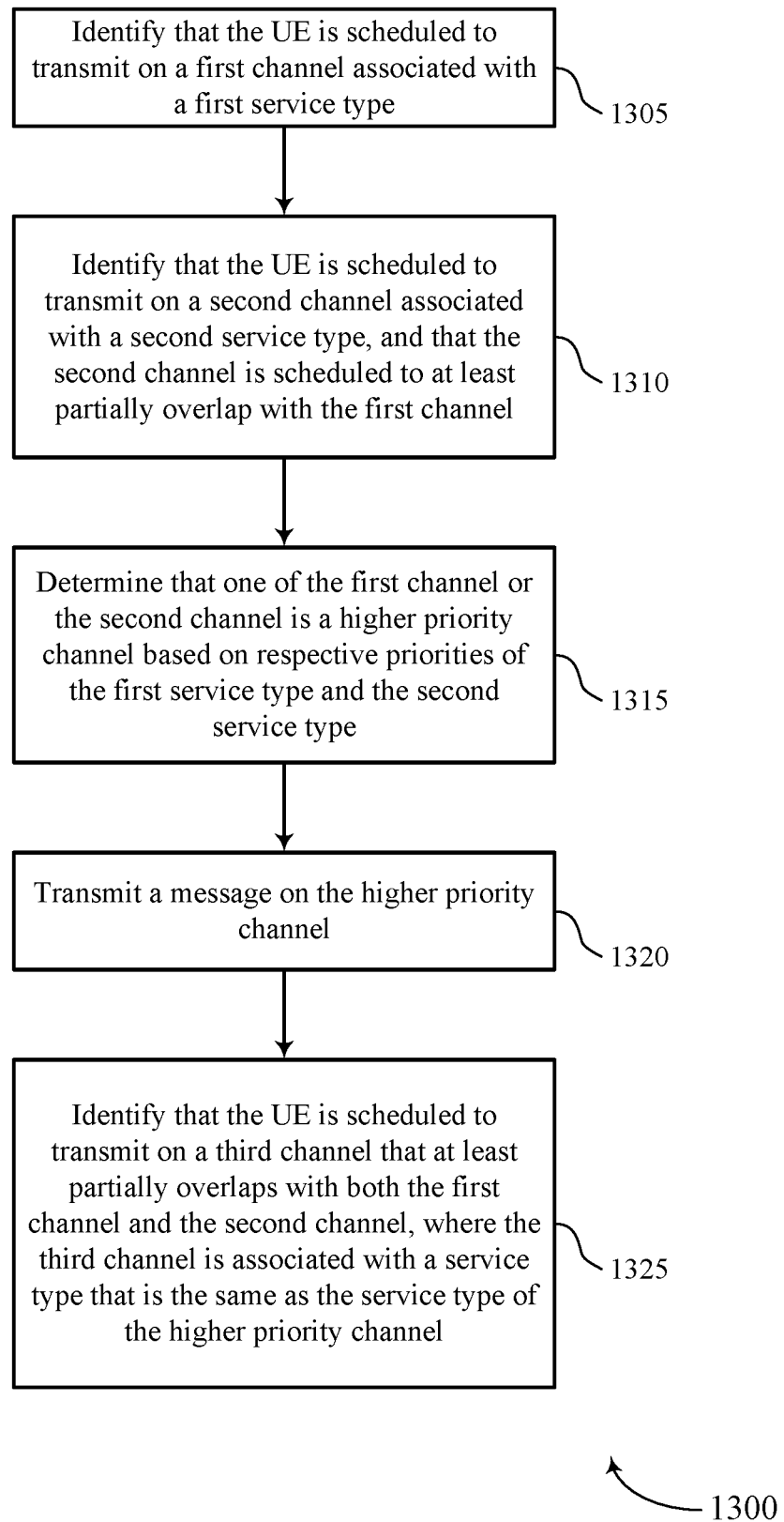

FIG. 13 shows a flowchart illustrating a method 1300 that supports uplink collision handling for a wireless communication service in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1305, the UE may identify that the UE is scheduled to transmit on a first channel associated with a first service type. The operations of 1305 may be performed according to the methods described herein. In some examples, aspects of the operations of 1305 may be performed by a parameter identifier as described with reference to FIGS. 4 through 7.

At 1310, the UE may identify that the UE is scheduled to transmit on a second channel associated with a second service type, and that the second channel is scheduled to at least partially overlap with the first channel. The operations of 1310 may be performed according to the methods described herein. In some examples, aspects of the operations of 1310 may be performed by a parameter identifier as described with reference to FIGS. 4 through 7.

At 1315, the UE may determine that one of the first channel or the second channel is a higher priority channel based on respective priorities of the first service type and the second service type. The operations of 1315 may be performed according to the methods described herein. In some examples, aspects of the operations of 1315 may be performed by a priority manager as described with reference to FIGS. 4 through 7.

At 1320, the UE may transmit a message on the higher priority channel. The operations of 1320 may be performed according to the methods described herein. In some examples, aspects of the operations of 1320 may be performed by a transmission component as described with reference to FIGS. 4 through 7.

At 1325, the UE may identify that the UE is scheduled to transmit on a third channel that at least partially overlaps with both the first channel and the second channel, where the third channel is associated with a service type that is the same as the service type of the higher priority channel. The operations of 1325 may be performed according to the methods described herein. In some examples, aspects of the operations of 1325 may be performed by a parameter identifier as described with reference to FIGS. 4 through 7.

Figure 14:
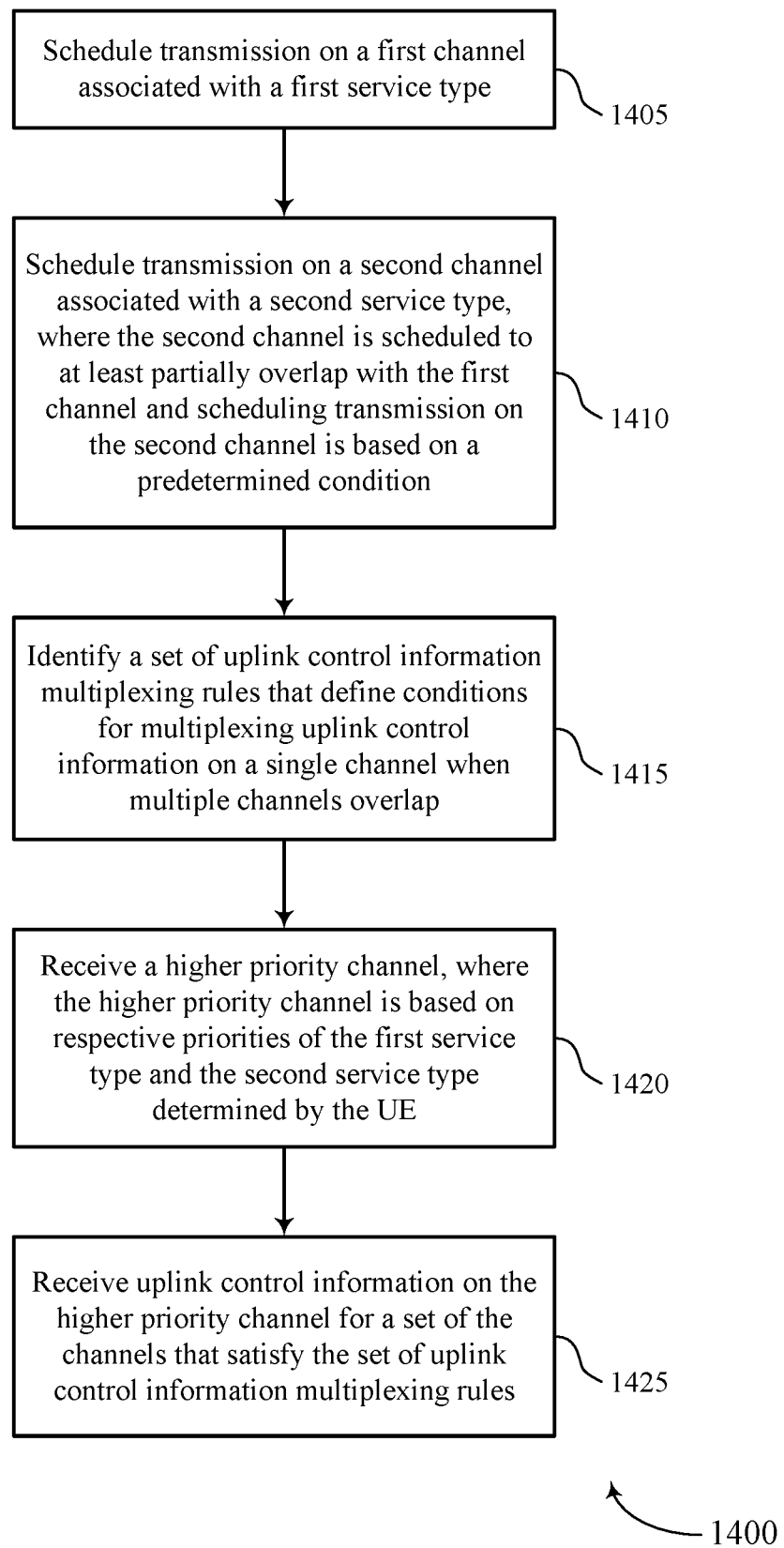

FIG. 14 shows a flowchart illustrating a method 1400 that supports uplink collision handling for a wireless communication service in accordance with aspects of the present disclosure. The operations of method 1400 may be implemented by a base station 105 or its components as described herein. For example, the operations of method 1400 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1405, the base station may schedule transmission on a first channel associated with a first service type. The operations of 1405 may be performed according to the methods described herein. In some examples, aspects of the operations of 1405 may be performed by a scheduling component as described with reference to FIGS. 8 through 11.

At 1410, the base station may schedule transmission on a second channel associated with a second service type, where the second channel is scheduled to at least partially overlap with the first channel and scheduling transmission on the second channel is based on a predetermined condition. The operations of 1410 may be performed according to the methods described herein. In some examples, aspects of the operations of 1410 may be performed by a scheduling component as described with reference to FIGS. 8 through 11.

At 1415, the base station may identify a set of uplink control information multiplexing rules that define conditions for multiplexing uplink control information on a single channel when multiple channels overlap. The operations of 1415 may be performed according to the methods described herein. In some examples, aspects of the operations of 1415 may be performed by a parameter identifier as described with reference to FIGS. 8 through 11.

At 1420, the base station may receive a higher priority channel, where the higher priority channel is based on respective priorities of the first service type and the second service type determined by the UE. The operations of 1420 may be performed according to the methods described herein. In some examples, aspects of the operations of 1420 may be performed by a priority manager as described with reference to FIGS. 8 through 11.

At 1425, the base station may receive uplink control information on the higher priority channel for a set of the channels that satisfy the set of uplink control information multiplexing rules. The operations of 1425 may be performed according to the methods described herein. In some examples, aspects of the operations of 1425 may be performed by a receiving component as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    identifying that the UE is scheduled to transmit on a first channel associated with a first service type;
    identifying that the UE is scheduled to transmit on a second channel associated with a second service type, and that the second channel is scheduled to at least partially overlap with the first channel;
    determining that one of the first channel or the second channel is a higher priority channel based at least in part on respective priorities of the first service type and the second service type;
    determining that the UE supports simultaneous transmission of partially overlapping channels and that the UE is power-limited; and
    transmitting a message on the higher priority channel, based at least in part on the UE being power-limited.

2. The method of claim 1, further comprising:
    determining that the UE is to transmit on only one of the first channel or the second channel based on the second channel being scheduled to at least partially overlap with the first channel and based on a predetermined condition.

3. The method of claim 2, wherein determining that the UE is to transmit on only one of the first channel or the second channel based on the predetermined condition comprises:
    identifying a set of uplink control information multiplexing rules that define conditions for multiplexing uplink control information on a single channel when multiple channels overlap; and
    determining that the set of uplink control information multiplexing rules are not satisfied.

4. The method of claim 1,
    wherein transmitting the message on the higher priority channel comprises transmitting the message using a transmission power that is greater than other transmission powers used for other simultaneous transmissions on channels that partially overlap with the higher priority channel, based at least in part on the UE being power-limited.

5. The method of claim 1, further comprising:
    identifying that the UE is scheduled to transmit on a third channel that at least partially overlaps with both the first channel and the second channel, wherein the third channel is associated with a service type that is not the same as the service type of the higher priority channel.

6. The method of claim 5, further comprising:
    determining that a timeline for each of the first channel, the second channel, and the third channel satisfies a set of uplink control information multiplexing rules that define conditions for multiplexing uplink control information on a single channel when multiple channels overlap; and
    determining that the UE is to transmit uplink control information for each of the first channel, the second channel, and the third channel on the higher priority channel.

7. The method of claim 5, further comprising:
    determining that a timeline for some, but not all, of the first channel, the second channel, and the third channel satisfies a set of uplink control information multiplexing rules that define conditions for multiplexing uplink control information on a single channel when multiple channels overlap, with the higher priority channel being one of the channels for which the timeline is determined to satisfy the set of uplink control information multiplexing rules; and
    determining that the UE is to transmit uplink control information on the higher priority channel for only the some of the channels that satisfy the set of uplink control information multiplexing rules.

8. The method of claim 5, further comprising:
    determining that a timeline for none of the first channel, the second channel, or the third channel satisfies a set of uplink control information multiplexing rules that define conditions for multiplexing uplink control information on a single channel when multiple channels overlap; and
    dropping transmission of all uplink control information associated with channels other than the higher priority channel.

9. The method of claim 5, further comprising:
    dropping all lower priority channels regardless of timelines thereof, wherein the lower priority channels are eMBB channels.

10. The method of claim 1, further comprising:
identifying that the UE is scheduled to transmit on a third channel that at least partially overlaps with both the first channel and the second channel, wherein the third channel is associated with a service type that is the same as the service type of the higher priority channel.

11. The method of claim 10, further comprising:
determining that a timeline for each of the first channel, the second channel, and the third channel satisfies a set of uplink control information multiplexing rules that define conditions for multiplexing uplink control information on a single channel when multiple channels overlap; and
determining that the UE is to transmit uplink control information for each of the first channel, the second channel, and the third channel on at least one of the higher priority channel and the third channel.

12. The method of claim 10, further comprising:
determining that a timeline for some, but not all, of the first channel, the second channel, and the third channel satisfies a set of uplink control information multiplexing rules that define conditions for multiplexing uplink control information on a single channel when multiple channels overlap, with the higher priority channel being one of the channels for which the timeline is determined to satisfy the set of uplink control information multiplexing rules;
re-determining the higher priority channel from the first channel, the second channel, and the third channel based at least in part on respective priorities of the first service type and the second service type and a tie-breaking priority rule; and
determining that the UE is to transmit uplink control information on the higher priority channel for only some of the channels that satisfy the set of uplink control information multiplexing rules.

13. The method of claim 12, wherein the tie-breaking priority rule is based at least in part on a modulation and coding scheme or channel quality indicator used by each channel, timing parameters pertaining to timing durations between scheduled uplink channels and downlink channels associated with and preceding the scheduled uplink channels, associated search spaces, control resource sets, or bandwidth part indices, component carrier indices, associated radio network temporary identifiers, uplink control information content on the channels, or combinations thereof.

14. The method of claim 10, further comprising:
determining that a timeline for none of the first channel, the second channel, or the third channel satisfies a set of uplink control information multiplexing rules that define conditions for multiplexing uplink control information on a single channel when multiple channels overlap; and
dropping transmission of all uplink control information associated with channels other than the higher priority channel.

15. The method of claim 1, wherein:
determining that one of the first channel or the second channel is the higher priority channel is based at least in part on an indication field in downlink control information, a search space or control resource set, a bandwidth part, a radio network temporary identifier masking, physical downlink control channel scrambling, or combinations thereof.

16. The method of claim 1, wherein:
determining that one of the first channel or the second channel is the higher priority channel is based at least in part on a block error rate associated with a channel state information process to be reported, association with downlink control information detected via a priority-based radio network temporary identifier, use of a priority-based channel quality indicator table, timing parameters pertaining to timing durations between scheduled uplink channels and downlink channels associated with and preceding the scheduled uplink channels, or combinations thereof.

17. The method of claim 1, wherein the first service type and the second service type are one of an enhanced mobile broadband (eMBB) service or an ultra-reliable low-latency communications (URLLC) service.

18. The method of claim 1, wherein the first service type and the second service type are different classes of an ultra-reliable low-latency communications (URLLC) service.

19. A method for wireless communication at a base station, comprising:
scheduling transmission on a first channel associated with a first service type;
scheduling transmission on a second channel associated with a second service type, wherein the second channel is scheduled to at least partially overlap with the first channel and scheduling transmission on the second channel is based on a predetermined condition; and
receiving a higher priority channel, wherein the higher priority channel is based at least in part on respective priorities of the first service type and the second service type determined by the UE, and wherein the higher priority channel is received with a transmission power that is greater than other transmission powers used for other simultaneous transmissions on channels that partially overlap with the higher priority channel based at least in part on the UE being power-limited.

20. The method of claim 19, wherein the first service type and the second service type are one of an enhanced mobile broadband (eMBB) service or an ultra-reliable low-latency communications (URLLC) service.

21. The method of claim 19, wherein scheduling transmission on the second channel based on the predetermined condition comprises:
identifying a set of uplink control information multiplexing rules that define conditions for multiplexing uplink control information on a single channel when multiple channels overlap.

22. The method of claim 21, further comprising:
receiving uplink control information on the higher priority channel for a plurality of the channels that satisfy the set of uplink control information multiplexing rules.

23. The method of claim 19, further comprising:
receiving a transmission on a channel with reduced power.

24. The method of claim 19, wherein the first channel and the second channel are one of a physical uplink control channel (PUCCH) or a physical uplink shared channel (PUSCH).

25. An apparatus for wireless communication at a user equipment (UE), comprising: a processor, memory coupled with the processor; and instructions stored in the memory and executable by the processor to cause the apparatus to:
identify that the UE is scheduled to transmit on a first channel associated with a first service type;

identify that the UE is scheduled to transmit on a second channel associated with a second service type, and that the second channel is scheduled to at least partially overlap with the first channel;

determine that one of the first channel or the second channel is a higher priority channel based at least in part on respective priorities of the first service type and the second service type;

determine that the UE supports simultaneous transmission of partially overlapping channels and that the UE is power-limited; and transmit a message on the higher priority channel, based at least in part on the UE being power-limited.

26. The apparatus of claim 25, wherein the instructions are further executable by the processor to cause the apparatus to:

determine that the UE is to transmit on only one of the first channel or the second channel based on the second channel being scheduled to at least partially overlap with the first channel and based on a predetermined condition.

27. The apparatus of claim 25, wherein the instructions for determining that the UE is to transmit on only one of the first channel or the second channel based on a predetermined condition comprise instructions that are further executable by the processor to cause the apparatus to:

identify a set of uplink control information multiplexing rules that define conditions for multiplexing uplink control information on a single channel when multiple channels overlap; and determine that the set of uplink control information multiplexing rules are not satisfied.

28. An apparatus for wireless communication at a base station, comprising: a processor, memory coupled with the processor; and instructions stored in the memory and executable by the processor to cause the apparatus to:

schedule transmission on a first channel associated with a first service type;

schedule transmission on a second channel associated with a second service type, wherein the second channel is scheduled to at least partially overlap with the first channel and scheduling transmission on the second channel is based on a predetermined condition; and receive a higher priority channel, wherein the higher priority channel is based at least in part on respective priorities of the first service type and the second service type determined by the UE, and wherein the higher priority channel is received with a transmission power that is greater than other transmission powers used for other simultaneous transmissions on channels that partially overlap with the higher priority channel based at least in part on the UE being power-limited.

29. The apparatus of claim 28, wherein the first service type and the second service type are one of an enhanced mobile broadband (eMBB) service or an ultra-reliable low-latency communications (URLLC) service.

* * * * *